US006753080B1

(12) United States Patent
Sebastian et al.

(10) Patent No.: US 6,753,080 B1
(45) Date of Patent: *Jun. 22, 2004

(54) RECEPTOR MEDIUM HAVING A MICROFIBRILLATED SURFACE

(75) Inventors: John M. Sebastian, Maplewood, MN (US); Jeffrey O. Ernslander, Afton, MN (US); Mario A. Perez, Burnsville, MN (US); Terry R. Hobbs, Saint Paul, MN (US); Robert S. Kody, Minneapolis, MN (US); Caroline M. Ylitalo, Stillwater, MN (US); Robert D. Taylor, Stacy, MN (US); Oh Sang Woo, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 158 days.

This patent is subject to a terminal disclaimer.

(21) Appl. No.: 10/059,591

(22) Filed: Jan. 29, 2002

(51) Int. Cl.$^7$ .................................................. D02G 3/00
(52) U.S. Cl. ....................... 428/364; 428/195; 428/213; 428/220; 428/221; 428/357
(58) Field of Search ................................ 428/364, 195, 428/213, 220, 221, 357, 203, 40.1, 343

(56) References Cited

U.S. PATENT DOCUMENTS

| | | |
|---|---|---|
| 3,416,714 A | 12/1968 | Skinner |
| 3,470,594 A | 10/1969 | Kim |
| 3,470,685 A | 10/1969 | Hall et al. |
| 3,473,206 A | 10/1969 | Boultinghouse |
| 3,490,663 A | 1/1970 | Skinner |
| 3,500,626 A | 3/1970 | Sandiford |
| 3,542,632 A | 11/1970 | Eickhoff |
| 3,549,470 A | 12/1970 | Greenwald et al. |
| 3,565,985 A | 2/1971 | Schrenk et al. |
| 3,576,931 A | 4/1971 | Chopra et al. |
| 3,645,961 A | 2/1972 | Goldfein |
| 3,695,025 A | 10/1972 | Gibbon |
| 3,719,540 A | 3/1973 | Hall |
| 3,773,608 A | 11/1973 | Yoshimura et al. |
| 3,893,957 A | 7/1975 | Mixon et al. |
| 3,969,472 A | 7/1976 | Driscoll |
| 3,997,702 A | 12/1976 | Schurb et al. |
| 4,134,951 A | 1/1979 | Dow et al. |
| 4,313,988 A | 2/1982 | Koshar et al. |
| 4,348,350 A | 9/1982 | Meier et al. |
| 4,377,616 A | 3/1983 | Ashcraft et al. |
| 4,536,361 A | 8/1985 | Torobin |
| 4,565,840 A | 1/1986 | Kobayashi et al. |
| 4,567,073 A | 1/1986 | Larson et al. |
| 4,595,738 A | 6/1986 | Hufnagel et al. |
| H90 H | 7/1986 | Kumar |
| 4,605,592 A | 8/1986 | Paquette et al. |
| 4,614,667 A | 9/1986 | Larson et al. |
| 4,701,369 A | 10/1987 | Duncan |
| 4,701,370 A | 10/1987 | Park |
| 4,867,937 A | 9/1989 | Li et al. |
| 4,916,198 A | 4/1990 | Scheve et al. |
| 4,921,652 A | 5/1990 | Tsuji et al. |
| 4,940,736 A | 7/1990 | Alteepping et al. |
| 4,965,123 A | 10/1990 | Swan et al. |
| 4,973,517 A | 11/1990 | Lammers et al. |
| 5,032,460 A | 7/1991 | Kantner et al. |
| 5,043,197 A | 8/1991 | Renalls |
| 5,045,386 A | 9/1991 | Stan et al. |
| 5,049,347 A | 9/1991 | Magill et al. |
| 5,141,790 A | 8/1992 | Calhoun et al. |
| 5,160,674 A | 11/1992 | Colton et al. |
| 5,202,190 A | 4/1993 | Kantner et al. |
| 5,229,207 A | 7/1993 | Paquette et al. |
| 5,236,963 A | 8/1993 | Jacoby et al. |

(List continued on next page.)

FOREIGN PATENT DOCUMENTS

| | | |
|---|---|---|
| DE | 19840991 A1 | 3/2000 |
| EP | 0 488 577 B1 | 11/1993 |
| EP | 0 570 515 B1 | 6/1996 |
| EP | 0 806 512 A1 | 11/1997 |
| EP | 1 002 657 A1 | 5/2000 |
| GB | 1073741 | 6/1967 |
| GB | 1157695 | 7/1969 |
| GB | 1171543 | 11/1969 |
| GB | 1 234 782 | 6/1971 |
| GB | 1 267 298 | 3/1972 |
| GB | 1 541 681 | 3/1979 |
| GB | 2 034 243 A | 6/1980 |
| GB | 2 061 281 B | 5/1981 |

(List continued on next page.)

OTHER PUBLICATIONS

"Survey of Polymer Morphology", pp. 149–177.
"Thin Films (Film Formation Techniques)", Encyclopedia of Chemical Technology, (4$^{th}$ ed.), 1997 pp. 1040–1076, vol. 23.
AFFINITO et al., "Polymer/Polymer, Polymer.Oxide, and Polymer/Metal Vacuum Deposited Interference Filters", Proc. of the 10 International Conf. on Vacuum Coating, 1996, pp. 207–220.
BARHAM et al., "A Study on the Achievement of High–Modulus Polyethylene Fibres by Drawing", Journal of Materials Science, (1976), pp. 27–35, vol. 11.
BIGG, "Mechanical Property Enhancement of Semicrystalline Polymers", Polymer Engineering and Science, Jul. 1988, pp. 830–841, vol. 28, No. 13.

(List continued on next page.)

Primary Examiner—Tamra Dicus
Assistant Examiner—Cynthia H. Kelly
(74) Attorney, Agent, or Firm—Kent S. Kokko

(57) ABSTRACT

A receptor medium with an oriented film having at least one microfibrillated surface is described. The receptor medium can receive jettable materials, which include inks, adhesives, particulate dispersions, electrically, thermally or magnetically modifiable materials, biological fluids, chemical reagents and combinations thereof. The microfibrillated surface provides good ink receptive properties particularly for solvent based inks.

44 Claims, No Drawings

U.S. PATENT DOCUMENTS

| | | | |
|---|---|---|---|
| 5,258,220 A | 11/1993 | Joseph | |
| 5,290,615 A | 3/1994 | Tushaus et al. | |
| 5,300,357 A | 4/1994 | Gardiner | |
| 5,330,827 A | 7/1994 | Hansen | |
| 5,338,357 A | 8/1994 | Takai et al. | |
| 5,354,597 A * | 10/1994 | Capik et al. | 428/152 |
| 5,366,804 A | 11/1994 | Dugan | |
| 5,378,537 A | 1/1995 | Masuda et al. | |
| 5,422,175 A | 6/1995 | Ito et al. | |
| 5,434,002 A | 7/1995 | Yoon et al. | |
| 5,456,752 A | 10/1995 | Hogan | |
| 5,589,264 A | 12/1996 | Yoon et al. | |
| 5,594,070 A | 1/1997 | Jacoby et al. | |
| 5,637,663 A | 6/1997 | Anolick et al. | |
| 5,683,954 A * | 11/1997 | Sogabe et al. | 503/227 |
| 5,686,602 A | 11/1997 | Farooq et al. | |
| 5,698,489 A | 12/1997 | Shirai et al. | |
| 5,770,144 A | 6/1998 | James et al. | |
| 5,783,503 A | 7/1998 | Gillespie et al. | |
| 5,795,696 A * | 8/1998 | Malhotra | 430/124 |
| 5,804,625 A | 9/1998 | Temperante et al. | |
| 5,807,516 A | 9/1998 | Wolstenholme et al. | |
| 5,811,493 A | 9/1998 | Kent | |
| 5,843,057 A * | 12/1998 | McCormack | 604/367 |
| 5,845,355 A | 12/1998 | Strahm | |
| 5,861,213 A | 1/1999 | Ohmory et al. | |
| 5,908,598 A | 6/1999 | Rousseau et al. | |
| 5,945,215 A | 8/1999 | Bersted et al. | |
| 5,945,221 A | 8/1999 | Tsai et al. | |
| 5,957,724 A | 9/1999 | Lester | |
| 6,013,587 A | 1/2000 | Truong et al. | |
| 6,096,469 A * | 8/2000 | Anderson et al. | 430/119 |
| 6,110,588 A | 8/2000 | Perez et al. | |
| 6,120,888 A | 9/2000 | Dolsey et al. | |
| 6,124,058 A | 9/2000 | Ohmory et al. | |
| 6,255,403 B1 | 7/2001 | Andrist et al. | |
| 6,331,343 B1 | 12/2001 | Perez et al. | |
| 6,333,433 B1 | 12/2001 | Banerjee et al. | |
| 6,416,853 B1 * | 7/2002 | Nakashima et al. | 428/313.9 |
| 2001/0031594 A1 | 10/2001 | Perez et al. | |
| 2002/0025442 A1 | 2/2002 | Chang et al. | |

FOREIGN PATENT DOCUMENTS

| | | |
|---|---|---|
| GB | 1 605 004 | 12/1981 |
| JP | 51-29191 | 8/1976 |
| JP | 51-33152 | 9/1976 |
| JP | 61-258060 | 11/1986 |
| JP | 63-85154 | 4/1988 |
| JP | 4-194068 | 7/1992 |
| JP | 02 672188 | 11/1997 |
| JP | 2000-256934 A | 9/2000 |
| WO | WO 97/49326 | 12/1997 |
| WO | WO 99/03685 | 1/1999 |
| WO | WO 99/06622 | 2/1999 |
| WO | WO 99/06623 | 2/1999 |
| WO | WO 99/07558 | 2/1999 |
| WO | WO 99/33669 | 7/1999 |
| WO | WO 99/55537 | 11/1999 |
| WO | WO 99/61520 | 12/1999 |
| WO | WO 99/65702 A1 | 12/1999 |
| WO | WO 00/46435 | 8/2000 |
| WO | WO 00/63023 | 10/2000 |
| WO | WO 00/68301 | 11/2000 |
| WO | WO 00/69646 A1 | 11/2000 |
| WO | WO 00/71789 A1 | 11/2000 |
| WO | WO 00/73082 A1 | 12/2000 |
| WO | WO 00/730873 A1 | 12/2000 |
| WO | WO 01/96122 A | 12/2001 |

OTHER PUBLICATIONS

CAPACCIO et al., "Effect of Molecular Weight on the morphology and Drawing Behaviour of Melt Crystallized Linear Polyethylene", Polymer, (Apr. 1975), pp. 239–243, vol. 16.

DAVIES, "The Separation of Airborne Dust and Particles", The Institution of Mechanical Engineers, London, proceedings 1B, 1952.

Encyclopedia of Polymer Science and Engineering, "Emulsion Polymerization to Fibers, Manufacture", (1986), pp. 830–831, vol. 6.

Encyclopedia of Polymer Science and Engineering, "Emulsion Polymerization to Fibers, Manufacture", (1986), pp. 648, 649, 806–821, vol. 6, $2^{nd}$ Ed.

Encyclopedia of Polymer Science and Engineering, "Identification to Lignin", (1987), pp. 685–688, vol. 8.

Encyclopedia of Polymer Science and Engineering, "Peroxy Compounds to Polyesters", (1988), pp. 433–434, vol. 11.

Essentials of Textiles, Holt, Rinehart and Winston, Inc., $4^{th}$ Ed., "Other Fabric–Construction Processes", pp. 235–238.

Karger–Kocsis, "Polypropylene: Structure, Blends and Composites", 1994, pp. 116–139, vol. 1.

Macknight et al. "Polymer Blends", pp. 428–435, Chapter 12, vol. 12.

Porter et al., "Uniaxial Extension and Order Development in Flexible Chain Polymer", Journal of Macromolecular Science–Rev. Macromol. Chem. Phys., C35(a), 1995, pp. 63–115.

The $29^{th}$ Clemson Nonwoven Fabrics Forum, Jun. 22–25, 1998, pp. 1–16.

The Nonwoven Fabrics Handbook, pp. 59–62, 87–88, 98.

U.S. patent application Ser. No. 09/314,034, Macroporous Ink Receiving Media, filed May 28, 1999.

\* cited by examiner

US 6,753,080 B1

RECEPTOR MEDIUM HAVING A MICROFIBRILLATED SURFACE

FIELD OF THE INVENTION

The present invention relates to the use of microfibers and/or microflakes as receptor media for a printable substrate. The printable substrate includes an oriented film with at least one microfibrillated, ink receptive surface. Printing on such receptor media with inkjet printers provides fine-resolution images with good solid fill. This type of printable substrate can be used with many types of inkjet inks.

BACKGROUND OF THE INVENTION

Image graphics are omnipresent in modem life. Images and data that warn, educate, entertain, advertise, etc. are applied on a variety of interior and exterior, vertical and horizontal surfaces. Nonlimiting examples of image graphics range from advertisements on walls or sides of trucks, to posters that advertise the arrival of a new movie, warning signs near the edges of stairways, and the like.

The use of thermal and piezoelectric inkjet inks has greatly increased in recent years with accelerated development of inexpensive and efficient inkjet printers, ink delivery systems, and the like.

Inkjet printers have come into general use for wide-format electronic printing for applications such as engineering and architectural drawings. Because of the simplicity of operation and economy of inkjet printers, this image process holds a superior growth potential promise for the printing industry to produce wide format, image on demand, presentation quality graphics.

Therefore, the components of an inkjet system used for making graphics can be grouped into three major categories:

1. Computer; software, printer
2. Ink
3. Receptor medium

The computer, software, and printer will control the size, number and placement of the ink drops and will transport the receptor medium through the printer. The ink will contain the colorant which forms the image and carrier for that colorant. The receptor medium provides the repository which accepts and holds the ink. The quality of the inkjet image is a function of the total system. However, the compositions and interaction between the ink and receptor medium are most important in an inkjet system.

Image quality is what the viewing public and paying customers will want and demand to see. From the producer of the image graphic, many other obscure demands are also placed on the inkjet media/ink system from the print shop. Also, exposure to the environment can place additional demands on the media and ink (depending on the application of the graphic).

Media for inkjet printers are also undergoing accelerated development. Because inkjet imaging techniques have become vastly popular in commercial and consumer applications, the ability to use a personal computer to print a color image on paper or other receptor media has extended from dye-based inks to pigment-based inks. The media must accommodate that change. Pigment-based inks provide more durable images because of the large size of colorant as compared to dye molecules, which results in superior fade resistance and improved water fastness.

Inkjet printing is emerging as the digital printing method of choice due to its good resolution, flexibility, high speed, and affordability. Inkjet printers operate by ejecting, onto a receiving substrate, controlled patterns of closely spaced ink droplets. By selectively regulating the pattern of ink droplets, inkjet printers can produce a wide variety of printed features, including text, graphics, holograms, and the like. The inks most commonly used in small inkjet printers, such as those used in the small office and home office (SOHO) markets, are water based. Industrial type wide format inkjet printers can use water based inks such as the Novajet printers from Encad Inc. (San Diego, Calif.), oil based inks such as piezo print 5000 from Raster Graphics Inc. (San Jose, Calif.), solvent based inks such as the PressVu printers from VUTEk, Inc. (Meredith, N.H.), or UV curable inkjet inks such as the SIAS printer from Siasprint Group (Novara, Italy). This wide variety of inks typically requires specialized substrates, where each specific substrate is optimized to work with a specific type of inkjet ink. For example, water based inks require porous substrates or substrates with special hydrophilic coatings that absorb the large quantities of water contained in these inks. Oil based inks are similar to water based inks in that they require the use of either porous substrates or substrates coated with a receptor that is oil absorbing.

On the other hand, solvent based inks typically contain about 90% organic solvents. These inks work well on substrates that have high affinity to the solvents, where the solvents can quickly penetrate the polymeric film preventing the printed ink layer from running down the film. In high speed inkjet printing, there is a need to drive off large quantities of solvent so that the substrate is dry enough to be rolled without blocking in a relatively short period of time. Therefore, typical solvent based inkjet inks consist of aggressive solvents such as cyclohexanone and acetates that penetrate quickly into typical films such as vinyl giving the printed graphic a "dry" feel within a short period of time from printing. As a consequence, the quickly penetrating solvents tend to remain in the film (as well as in the PSA backing if present) resulting in deteriorated film properties, reduced PSA performance, and strong odor when the graphic is unrolled and applied to a flat surface.

In particular, most wide format solvent based piezo inkjet inks require a very low viscosity for jetting, resulting in a very high ratio of solvent to binder/pigment. Large amounts of ink must be jetted onto the desired substrate to produce a graphic with acceptable image density. Polyvinyl chloride (PVC) is typically used for producing large format durable graphics. The solvents used in the inks are quickly absorbed into the vinyl film and adhesive layers, leaving the pigment and binder on the surface of the film and resulting in acceptable image quality. The piezo ink solvents are very compatible with the PVC and adhesive layers, and also have relatively high boiling points so it is difficult to fully dry all of the solvent from a printed sample, especially with the constraints typical of a graphic production shop. The presence of the retained solvent negatively affects product performance in three ways: 1) the solvents migrate through the PVC and plasticize the adhesive which results in very poor adhesive performance, 2) the solvents are retained in the PVC film layer resulting in decreased film properties, and 3) the retained solvents in the film and adhesive have an objectionable odor which is very noticeable especially on large format graphics, and has been noted as objectionable by a number of customers. Traditional olefin-based graphic films can work well for screenprint and flexographic printing, but have problems with solvent based piezo inks because the large amount of solvents jetted cannot be absorbed into the film. When large amounts of piezo inkjet inks are printed onto traditional olefin based graphic films the inks pool on the surface of the film and readily run, producing a poor quality, distorted image. There is a need for a substrate that is receptive to solvent based piezo inkjet inks, does not allow running of the inks, provides good adhesion of the inks when dry, and dries quickly to prevent objectionable odors.

In order to avoid the challenges associated with the above-described inks, there is a drive in the marketplace to move towards UV curable inkjet inks. These inks are expected to provide an "instant dry" feature when exposed to UV radiation. However, the use of UV curable inkjet inks requires redesigning the printer to accommodate curing lamps. This increases the cost of the printer. Additionally, there is an inherent problem with UV curable inkjet inks: in order to obtain fine line resolution, the inks should be cured within a relatively short time from printing, which results in poor ink flow and leveling compromising the quality of the solid fill areas of the graphic. But to obtain good solid fill, the inks should be allowed to flow and level before curing, which results in the loss of fine line resolution.

Therefore, a need exists for a universal substrate that can be used with all types of inkjet inks, and that does not require a special receptor coating or UV curing conditions.

We have discovered that microfibrillated films provide good ink receptive properties for various types of inkjet inks.

SUMMARY OF THE INVENTION

The present invention concerns the finding that certain polymeric films, which are not good receptors for inkjet inks can produce good inkjet printed articles when they are microfibrillated. For example, polypropylene and polylactic acid films can be microfibrillated using a hydroentangling process described in U.S. Pat. No. 6,110,588 which patent is incorporated herein by reference. This process produces a microfibrillated substrate with very fine microfibers or microflakes having a very large surface area. When printed with solvent based piezo and water based inkjet inks much of the ink adsorbs onto the large surface area of the microfibers or microflakes, eliminating ink puddling and running. Due to the microscale of the microfibers and microflakes, the solvent in the ink remains close to the air interface (e.g., from microfibrillated, oriented polypropylene films) compared with PVC films, the microfibrillated substrates feel dry to the touch after printing and do not have a significant solvent odor, which the PVC films often have. The dried images also have little residual odor resulting from solvent because the solvents remain close to the surface of the microfibers resulting in faster evaporation of the solvents from the receptor media. PVC films that absorb large amounts of the ink solvents typically have residual odors because evaporation of the solvents from the film is very slow. Upon drying, the inks bond very well to the microfibrillated structures and are difficult to abrade off, resulting in a durable image. This is surprising because the microfibers and microflakes are composed of materials that the ink systems do not bond to as well when printed on the unfibrillated film form. For example, ink solvents (including water) have a very low rate of diffusion into films of polypropylene (PP), polyester (PET) and polylactic acid (PLA), and ink in the printed images pools and runs severely with solvent based inkjet inks, and beads up and runs with water based inkjet inks. When dry, the beaded-up areas of ink have poor adhesion to any of these materials in film form. When these films are microfibrillated the inks are adsorbed onto the microfibers and microflakes and do not run or puddle. Upon drying the image is well bonded to the substrate and extremely difficult to abrade without abrading the fibers. The dried images also have little residual odor resulting from solvent because the solvents are held to the surface of the microfibers resulting in faster evaporation of the solvents from the receptor media. PVC films, which absorb large amounts of the ink solvents typically, have residual odors because evaporation of the solvents from the film is very slow. The excellent adhesion of the inks to microfibrillated substrates is believed to occur because the very small microfibers are coated with ink binder/pigment producing a physical interlock of the inks to the substrate; this is very different from the chemical bonding mechanism that occurs when the inks are printed onto a relatively smooth film.

Accordingly, the present invention is directed to a receptor medium including an oriented film having at least one microfibrillated surface with a depth of microfibrillation of greater than 10 microns.

One embodiment of the present invention includes a uniaxially oriented film with a microfibrillated surface containing melt-processed polymer microfibers having an average effective diameter of less than 20 microns and a transverse aspect ratio of 1.5:1 to 20:1.

Another embodiment of the present invention is directed to a receptive medium including a biaxially oriented film containing a mixture of a melt-processed polymer or polymer blend and a void initiating component.

The present invention also includes a method of producing an image which includes the step of printing a jettable material through an inkjet printing head onto the above defined receptor medium.

The present invention further includes an imaged graphics film including the above defined receptor medium having an inkjettable material on a surface of the receptor medium.

Another embodiment of the present invention includes a multiple component receptor medium containing:
  (a) a biaxially oriented film having at least one microfibrillated surface;
  (b) an adhesive layer on a major surface opposite the microfibrillated surface;
  (c) a release liner protecting the adhesive layer; and
  (d) an inkjettable material, such as an ink, deposited on the microfibrillated surface.

A particular embodiment of the present invention includes a receptor medium and an imaged graphics film containing the receptor medium where the receptor medium contains a biaxially oriented film having at least one microfibrillated surface, the surface including:
  (a) polypropylene;
  (b) a void initiating component comprising solid particles and/or an immiscible polymer.

"Immiscible" refers to polymer blends with limited mutual solubility and non-zero interfacial tension, i.e. a blend whose free energy of mixing is greater than zero:

$$\Delta G_m \cong \Delta H_m > 0$$

Still another particular embodiment of the present invention includes a multiple component receptor medium containing
  (a) a biaxially oriented film having at least one microfibrillated surface, said surface comprising:
    (i) polypropylene; and
    (ii) a void initiating component comprising inorganic solid particles, copolymers of ethylene selected from the group consisting of acid/acrylate modified ethylene vinyl acetate resin, terpolymer of ethylene/vinyl acetate/carbon monoxide/ethylene, poly(isobutyl)methacrylate and combinations thereof;

(b) an adhesive layer on a major surface opposite the microfibrillated surface;

(c) a release liner protecting the adhesive layer; and (d) an inkjet ink deposited on the microfibrillated surface.

Advantageously, the present invention allows printing with solvent-based, water-based, oil based, or radiation curable inkjet inks onto receptor media containing microfibers and/or microflakes to provide fine-resolution images with good solid fill.

These microfibrillated materials are comprised of microfibers or microflakes, which are physically unique in their microscopic dimensionality. The microfibers are ribbon like in contrast to standard melt blown microfibers, which are generally cylindrical in shape, and the microflakes are flake-like structures that are physically bound to the polymer film. The microflakes may have a thickness from 1 to 20 micrometers depending on the nature of orientation, preferably from 1 to 10 micrometers and most preferably from 1to 5 micrometers. The aspect ratio of the surface of a microflake may range from 1:1 to 1:20 depending on how balanced the orientation is. If the orientation is unbalanced (machine direction orientation does not equal transverse direction orientation), the microflakes have an increased dimension in the dominant orientation direction, and when the uniaxial orientation limit is reached, only microfibers are produced from microfibrillation. The use of the microfibrillated polymers also allows for the preparation of materials into fibrous substrates that are not easily made into microfibers of this size by other means, e.g. high molecular weight resins, incompatible blends, highly filled systems, and the like. Due to the surface texture comprising microfibers and microflakes, the present microfibrillated polymeric materials allow for printing on poor inkjet-receptive materials (e.g. low surface energy polyolefins) without surface treatments (i.e. print receptive coatings, corona discharge, etc.), preventing the inks from feathering and beading up as they do on the films that have not been microfibrillated. In addition, this surface texture helps to control dot gain. Dots printed on the present microfibrillated materials show an immediate finite dot gain which does not change significantly with time as is common with most inkjet receptive materials. Thus, microfibrillation improves resolution, by better controlling the bleeding together of print lines.

Because of the presence of microfibers or microflakes in their surface, the present microfibrillated materials provide a number of advantageous properties. For example these materials prevent the inks from running even with high solvent loading and also minimize intercolor ink bleed. Inkjet printed inks feel dry to the touch quickly after printing so that they may be transferred immediately after printing without smudging and may be rolled up without causing surface impressions or blocking of the image. They do not retain solvent for long periods of time as PVC based films do. Thus, they do not tend to emanate an undesirable solvent odor when unrolled and displayed. Microfibrillated materials can also provide a moderate degree of waterfastness to water-based inks. The microfibrillated surfaces may be embossed after printing to provide other properties, including special optical effects.

The degree of surface microfibrillation of an oriented polymer may be selected, controlled, and used as a way to affect printing quality. Thus, a printed sheet can be generated from a single precursor film (no lamination or coating or binders required) when only partial microfibrillation is employed. The receptor medium has a microfibrous or microflake surface that has a high surface area but the film itself may not be permeable or have low permeability to solvents in the ink. Therefore, the receptor medium of the present invention may comprise both a receptor layer (the microfibrillated surface) and a solvent barrier layer (the unmicrofibrillated base film) preventing the solvent in the inkjet inks from adversely affecting any adhesives located on the unmicrofibrillated side. This also eliminates curling problems, which occur when the coatings dry due to swelling and de-swelling of solvent sensitive materials. Because significant amounts of the ink solvents are not absorbed into the material comprising the microfibers or microflakes and do not penetrate into the base film, there is no need for a carrier liner as is required for printing on thin (4 mil) PVC-based graphics films which tend to absorb solvent and curl up.

Through this microfibrillated film making process it is possible to incorporate one or more additives that may improve printing quality directly into the melt instead of having to solvent coat the additive(s) onto the surface. This eliminates the need for an extra coating step and the use of solvents which may be environmentally unfriendly. These print quality improvement additives tend to improve the color density of inkjet ink on both the microfibrillated material and the unfibrillated material, but they do not substantially enhance the image resolution on the precursor (unfibrillated) film, which still suffers from ink bleeding and mottling.

When microfibrillated materials are prepared from low surface energy polymers (e.g., polyolefins), color density tends to be low. This low color density does not appear to be due to the lack of ink absorption into the microfibrillated materials, but rather due to insufficient ink spreading on the surfaces of the microfibrillated material. To improve color density, blends of one or more polymers with print quality improvement additives selected from the group consisting of polymers, surfactants, and mordants may be used. These polymers and surfactants are selected for their ability to increase surface energy of the microfibrillated material or for their affinity for the binders in the ink to promote spreading of the ink on the surface. The mordants are selected for their ability to shorten drying time by complexing with the colorant in the ink making make the inkjet printed image smudge-free and/or water fast.

DETAILED DESCRIPTION

The present invention provides a receptor medium which includes an oriented film having at least one microfibrillated surface with a depth of microfibrillation of greater than 10 microns. The films may be uniaxially oriented to produce a fibrous surface having polymeric microfibers of average effective diameter of less than 20 microns, generally from 0.01 to 10 microns, and a substantially rectangular cross-section, having a transverse aspect ratio (width to thickness) of from 1.5:1 to 20:1. Such microfiber uniaxially oriented films and methods of making them, including microfibrillation, are described in U.S. Pat. No. 6,110,588, which patent is incorporated herein by reference. Alternatively, the films may be biaxially oriented to produce a microfibrous surface of microflakes that are thin in cross-section, in comparison to the width and lengths, and irregular in shape. Such microflake biaxially oriented films and methods of making them, including microfibrillation, are described in U.S. Pat. No. 6,331,433, which patent is incorporated herein by reference. The microflakes are flake-like structures that are physically bound to the polymer film. The microflakes may have a thickness from 1 to 20 micrometers depending on the nature of orientation, preferably from 1 to 10 micrometers and most preferably from 1 to 5 micrometers. The aspect ratio of the surface of a microflake may range from 1:1 to 1:20 depending on how balanced the orientation is. If the orientation is unbalanced (machine direction orientation does not equal transverse direction orientation), the microflakes have an increased dimension in the dominant orientation direction, and when the uniaxial orientation limit is reached, only microfibers are produced from microfibrillation. Both the microfibers and the microflakes impart a large surface area to the film, which in combination with a high density of microfibers or microflakes, can minimize ink wicking or bleeding and provide high resolution in inkjet images.

Polymers useful in undergoing the microfibrillation process are single polymers or blends. A first polymer component or single polymer component includes any melt-processible crystalline, semi-crystalline or crystallizable polymer or copolymer, including block, grafted, and random copolymers. Semi-crystalline polymers consist of a mixture of amorphous regions and crystalline regions. The crystalline regions are more ordered, and segments of the chains actually pack in crystalline lattices. Some crystalline regions may be more ordered than others. If crystalline regions are heated above the melting temperature of the polymer, the molecules become less ordered or in more random. If cooled rapidly, this less ordered feature is "frozen" in place and the resulting polymer is said to be amorphous. If cooled slowly, these molecules can repack to form crystalline regions and the polymer is said to be semicrystalline. Some polymers remain amorphous and show no tendency to crystallize. Some polymers can be made semicrystalline by heat treatments, stretching or orienting and by solvent inducement, and these processes can control the degree of true crystallinity.

Semicrystalline polymers useful in the present invention include, but are not limited to, polyethylene, polypropylene, copolymers of polypropylene and polyethylene, poly(alpha) olefins, polyoxymethylene, poly(vinylidine fluoride), poly (methyl pentene), poly(ethylene-chlorotrifluoroethylene), poly(vinyl fluoride), poly(vinyl alcohol), poly(ethylene oxide), poly(ethylene terephthalate)(PET), poly(butylene terephthalate)(PBT), polylactide, nylon 6, nylon 66, nylon 610, nylon 612, polybutene, syndiotactic polystyrene and thermotropic liquid crystal polymers. Examples of suitable thermotropic liquid crystal polymers include aromatic polyesters, which exhibit liquid crystal properties when melted, and which are synthesized from aromatic diols, aromatic carboxylic acids, hydroxycarboxylic acids, and other like monomers. Typical examples include a first type consisting of parahydroxybenzoic acid (PHB), terephthalic acid, and biphenol; a second type consisting of PHB and 2,6-hydroxynaphthoic acid; and a third type consisting of PHB, terephthalic acid, and ethylene glycol. Preferred polymers are polyolefins such as polypropylene and polyethylene and polyethylene/polypropylene copolymers, that are readily available at low cost and can provide highly desirable properties in the fibrillated articles such as high modulus and high tensile strength.

The semicrystalline polymer component may further comprise, as a blend, a second polymer to impart desired properties to the microfibrillated film of the invention. The second polymer of such blends may be semicrystalline or amorphous and is generally present in less than 40 weight percent, based on the weight of the semicrystalline polymer component. For example, small amounts of polyethylene may be added to polypropylene, when used as the semicrystalline polymer component, to improve the softness and drapability of the microfibrillated film. Other polymers may be added as print quality improvement additives, for example, to enhance print color density. Still other polymers may be added to improve film stiffness, crack resistance, Elmendorff tear strength, elongation, tensile strength and impact strength, as is known in the art. Examples of particularly useful polymer blends include polypropylene with poly(ethylene terephthalate) (PET), poly(butylene terephthalate) (PBT), polyvinylpyrrolidone and an ionomer copolymer of ethylene and (meth)acrylic acid, ethylene vinyl acetate, polystyrene/polyisoprene copolymers, acid modified ethylene vinyl acetate, acid/acrylate modified ethylene vinyl acetate, polyether-ester elastomers, terpolymers of ethylene/vinyl acetate/carbon monoxide/ethylene without and with poly(isobutyl methacrylate), and thermoplastic polyurethanes. Other secondary polymers may include, for example, polycarbonates; polymethylpentene; nylons; acrylate and methacrylate homopolymers and copolymers; polystyrenes; vinylchloride/vinyl acetate copolymers; vinyl chloride/vinyl acetate/vinyl alcohol terpolymers; polyethyleneimines; acrylate and maleic anhydride modified ethylene vinyl acetate copolymers; copolymers of ethylene and methyl acrylate; ethylene/octene copolymers; blends of polyvinylpyrrolidone with polyvinylalcohol: copolymers or terpolymer of N-vinyl-2-pyrrolidinone with acrylic acid, dimethylaminoethyl acrylate, trimethoxysilylethylmethacrylate, and/or poly(ethylene oxide) acrylate; poly(cyclic olefins); and rubbers. When a secondary polymer is used as a print quality improvement additive, it may be combined with the microfibrillated film, not only by melt processing, but also by coating the microfibrillated film with a solution or dispersion of the additive.

The void-initiating component is chosen so as to be immiscible in the semicrystalline polymer component. It may be an organic or an inorganic solid particulate component having an average particle size of from about 0.1 to 10.0 microns and may be any shape including amorphous, needle-like, spindle, plate, diamond, cube, and sphere shapes. Inorganic solids useful as void initiating components include solid or hollow glass, ceramic or metal particles, microspheres or beads; zeolite particles; inorganic compounds including, but not limited to metal oxides such as titanium dioxide, alumina and silicon dioxide; metal, alkali- or alkaline earth carbonates or silicates, metasilicates, sulfates; kaolin, talc, carbon black and the like. Typically useful is calcium carbonate or wollastonite, i.e. calcium metasilicate. Inorganic void initiating components are chosen so as to have little surface interaction, due to either chemical nature or physical shapes, when dispersed in the semicrystalline polymer component. In general the inorganic void initiating components should not be chemically reactive with the semicrystalline polymer component, including Lewis acid/base interactions, and have minimal van der Waals interactions.

The void initiating component may be a thermoplastic polymer, including semicrystalline polymers and amorphous polymers, to provide a blend immiscible with the semicrystalline polymer component. An immiscible blend shows multiple amorphous phases as determined, for example, by the presence of multiple amorphous glass transition temperatures. As used herein, "immiscibility" refers to polymer blends with limited solubility and non-zero interfacial tension, i.e. a blend whose free energy of mixing is greater than zero:

$$\Delta G_m = \Delta H_m 0$$

Miscibility of polymers is determined by both thermodynamic and kinetic considerations. Common miscibility predictors for non-polar polymers are differences in solubility parameters or Flory-Huggins interaction parameters. For polymers with non-specific interactions, such a polyolefins, the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, the Flory-Huggins interaction parameter between two non-polar polymers is always a positive number indicating that the two polymers do not mix spontaneously and the blend is considered "immiscible".

Polymers useful as the void-initiating component include the above described semicrystalline polymers, as well as amorphous polymers, selected so as to form discrete phases upon cooling from the melt. Useful void-initiating polymers include, but are not limited to, polyesters, vinyl resins, copolymers of ethylene, polystyrene resins and copolymers thereof, polycarbonates, polyisobutylene, acrylates and methacrylate homopolymers and copolymers thereof, cyclic polyolefins, maleated polypropylene block copolymers, rubbers, sulfonated poly(ethylene terephthalate), polyvinylpyrrolidone and vinylpyrrolidinone copolymers, epoxies, thermoplastic polyurethanes, and combinations thereof. Examples of polystyrene copolymers include poly(styrene-co-acrylonitrile), poly(styrene-co-maleic anhydride), and poly(acrylonitrile-butadiene-styrene). Examples of useful acrylates and methacrylates include polymers of butyl acrylate, ethyl acrylate, isopropyl acrylate, methylacrylate, benzyl methacrylate, butyl methacrylate, cyclohexyl methacrylate, ethyl methacrylate, hexyl methacrylate, isobutyl methacrylate, isopropyl methacrylate, methyl methacrylate, phenyl methacrylate and propyl methacrylate. Examples of useful methacrylate copolymers include copolymers of methyl methacrylate with butyl methacrylate, ethyl methacrylate, isobutyl methacrylate, isobornyl methacrylate, and lauryl methacrylate, and butyl methacrylate with isobutyl methacrylate. Examples of cyclic polyolefins include polynorbornene and copolymers thereof. Examples of vinyl resins include poly(vinyl chloride), poly (vinyl acetate), and poly(vinyl alcohol). Examples of ethylene copolymers include acid modified ethylene vinyl acetate, metal ion neutralized copolymers of ethylene and methacrylic or acrylic acid, maleic anhydride grafted polyethylene, acid modified ethylene/acrylate/carbon monoxide terpolymers, ethylene/n-butyl acrylate/carbon monoxide terpolymer, ethylene/glycidyl methacrylate/carbon monoxide terpolymer, ethylene acrylic elastomers, ethylene/vinyl acetate/carbon monoxide terpolymer, and copolymers of ethylene and butyl-, ethyl-, and methyl acrylate. Typically useful are poly(ethylene terephthalate) or poly(butylene terephthalate), copolymers of methyl methacrylate with butyl acrylate, butyl methacrylate, isobutyl methacrylate or isobornyl methacrylate, copolymers of isobutylmethacrylate and butyl methacrylate; butyl methacrylate resins, or copolymers of ethylene, such as acid/acrylate modified ethylene vinyl acetate resin, terpolymer of ethylene/vinyl acetate/carbon monoxide/ethylene, and combinations thereof. Preferred void initiating components include a mixture of an inorganic solid particulate component and a polymer component as defined above.

When using an immiscible polymer blend, the relative amounts of the semicrystalline polymer component and void initiating polymer component can be chosen so the first polymer forms a continuous phase and the second polymer forms a discontinuous phase, or that the second polymer forms a continuous phase and the first polymer forms a discontinuous phase, or each polymer forms a continuous phase; as in an interpenetrating polymer network. The relative amounts of each polymer can vary widely, from 99:1 to 1:99 weight ratio. Preferably, the semicrystalline polymer component forms the continuous phase while the void initiating component forms a discontinuous, or discrete phase, dispersed within the continuous phase of the first polymer. In such constructions, the amount of void initiating component will affect final film properties. In general, as the amount of the void initiating component increases, the amount of voiding in the final film also increases. As a result, properties that are affected by the amount of voiding in the film, such as mechanical properties, density, light transmission, etc., will depend upon the amount of added void initiating component. When the void initiating component is a polymer, as the amount of void initiating polymer in the blend is increased, a composition range will be reached at which the void initiating polymer can no longer be easily identified as the dispersed, or discrete, phase. Further increase in the amount of void initiating polymer in the blend will result in a phase inversion wherein the void initiating polymer becomes the continuous phase.

Preferably, whether the void initiating component is organic, inorganic or both, the amount of the void initiating component in the composition is from 1% by weight to 65% by weight, more preferably from 20% by weight to 50% by weight, most preferably from 30% by weight to 45% by weight. In these composition ranges, the first semicrystalline polymer forms a continuous phase, while the void initiating component forms the discrete, discontinuous phase.

Additionally, the selected void initiating component must be immiscible with the semicrystalline polymer component selected. In this context, immiscibility means that the discrete phase does not dissolve into the continuous phase in a substantial fashion, i.e., the discrete phase must form separate, identifiable domains within the matrix provided by the continuous phase.

The molecular weight of each polymer should be chosen so that the polymer is melt processible under the processing conditions. For polypropylene and polyethylene, for example, the molecular weight may be from about 5000 to 500,000 and is preferably from about 190,000 to 300,000.

In order to obtain the maximum physical properties and render the polymer film amenable to microfibrillation, the polymer chains need to be oriented along at least one major axis (uniaxial) in one or more stages, and may further be oriented along two major axes (biaxial) either simultaneously or sequentially. The degree of molecular orientation is generally defined by the draw ratio, that is, the ratio of the final length or width to the original length or width, respectively. This orientation may be effected by a combination of techniques in the present invention, including the steps of calendering, length orienting, and tentering.

Processes for uniaxially orienting a film and microfibrillating the film are described in U.S. Pat. No. 6,110,588, which patent is incorporated herein by reference. Processes for biaxially orienting films and microfibrillating the films to prepare microfibers and microfibrous flakes (microflakes) are described in U.S. Pat. No. 6,331,433, which patent is also incorporated herein by reference.

Generally, greater void initiating content enhances the subsequent microfibrillation, and subsequently for uniaxially oriented films, the greater the yield of microfibers and for biaxially oriented films, the greater the yield of microflakes. Preferably, when preparing an article having at least one microfibrillated surface, the polymer film should have a void content in excess of 5%, more preferably in excess of 10%, most preferably in excess of 30%, as measured by density, i.e., the ratio of the density of the voided film with that of the starting film. The degree of voiding or void content in the oriented films is strongly dependent on the temperature and degree of orientation achieved during processing. To achieve higher void contents, it is preferred to keep the temperature just high enough to allow flow of the polymer(s) and to orient the film to the greatest extent possible without breaking the film.

In practice, the films first may be subjected to one or more processing steps to impart the desired degree of crystallinity to the semicrystalline polymer component, and further processed to impart the voids, or the voids may be imparted coincident with the process step(s), which impart crystallinity. Thus the same calendering or stretching steps that orient the polymer film and enhance the crystallinity (and orientation) of the polymer may concurrently impart voids.

In the present process the degree of microfibrillation can be controlled to provide a low degree to a high degree of microfibrillation, whether from a uni- or biaxially oriented film. In either microfibrillation process most of the microfibers or microflakes stay attached to the web due to incomplete release from the polymer matrix. Advantageously the microfibrillated article, having microfibers or microflakes secured to a web, provides a convenient and safe means of handling, storing and transporting the microfibrillated article without contamination due to nonbonded microfibers or microflakes. For many printing applications it is desirable to retain the microfibers or microflakes secured to the web.

The receptor medium of the present invention may also have an adhesive layer on the major surface of the sheet opposite the microfibrillated surface that is also optionally but preferably protected by a release liner. After imaging, the receptor medium can be adhered to a horizontal or vertical, interior or exterior surface to warn, educate, entertain, advertise, etc.

The choice of adhesive and release liner depends on usage desired for the image graphic.

Pressure-sensitive adhesives can be any conventional pressure-sensitive adhesive that adheres to both the polymer sheet and to the surface of the item upon which the inkjet receptor medium having the permanent, precise image is destined to be id placed. Pressure-sensitive adhesives are generally described in Satas, Ed., *Handbook of Pressure Sensitive Adhesives*, 2nd Ed. (Von Nostrand Reinhold 1989). Pressure-sensitive adhesives are commercially available from a number of sources. Particularly preferred are acrylate pressure-sensitive adhesives commercially available from Minnesota Mining and Manufacturing Company and generally described in U.S. Pat. Nos. 5,141,790; 4,605,592; 5,045,386; and 5,229,207; and EPO Patent Publication No. EP 0 570 515 B1 (Steelman et al.).

Release liners are also well known and commercially available from a number of sources. Nonlimiting examples of release liners include silicone coated craft paper, silicone coated polyethylene coated paper, silicone coated or non-coated polymeric materials such as polyethylene or polypropylene, as well as the aforementioned base materials coated with polymeric release agents such as silicone urea, urethanes, and long chain alkyl acrylates, such as defined in U.S. Pat. Nos. 5,957,724; 4,567,073; 4,313,988; 3,997,702; 4,614,667; 5,202,190; and 5,290,615; and those liners commercially available as Polysilk brand liners from Rexam Release of Oakbrook, Ill., and EXHERE brand liners from P.H. Glatfelter Company of Spring Grove, Pa.

The receptor media of the present invention have utility for the production of image graphics using inkjet printers. The present receptor media unexpectedly solve common inkjet image quality problems as feathering, banding and mud cracking (mud cracking where pigmented, binderless water based inks are used) in inkjet printing systems and also provide an adsorptive surface for the inks to prevent running and help bind the inks to the substrate. Because of the high surface area of the microfibrillated structures, the solvents of the ink are able to evaporate quickly, are not absorbed into the bulk of the fibers, and there is no residual odor from retained solvents during use as is common with current PVC-based products. Another advantage of the receptor media of the present invention is the usefulness of the microfibrillated surface with organic solvent-based, oil-based, water-based, or radiation polymerizable inks. The inks used on the receptor medium can further include either dye- or pigment-based colorants.

Inkjet receptor media of the present invention can be employed in any environment where inkjet images are desired to be precise, stable, rapid drying, handled immediately after printing, and abrasion resistant.

Inkjet receptor media of the present invention can accept a variety of inkjet ink formulations to produce rapid drying and precise inkjet images. The topography of the microfibrillated surface of the inkjet receptor medium can be varied for optimum results, depending on several factors, such as: ink droplet volume; ink liquid carrier composition; ink type (pigment or blend of pigment and aqueous or non-aqueous dye); and manufacturing technique (machine speed, resolution, roller configuration); etc.

The formation of precise inkjet images is provided by a variety of commercially available printers. Nonlimiting examples include thermal inkjet printers such as DeskJet brand, PaintJet brand, Deskwriter brand, DesignJet brand, and other printers commercially available from Hewlett-Packard Corporation of Palo Alto, Calif. Also included are piezo type inkjet printers such as those from Seiko-Epson, Raster Graphics, VUTEk, Scitex, Idanit, and Xerox, spray jet printers and continuous inkjet printers. Any of these commercially available printers introduces the ink in a jet spray of a specific image into the medium of the present invention. Apparent drying time is much more rapid under the present invention than if the imaging layer were to be applied to a similar non-microfibrillated media.

The media of the present invention can be used with a variety of inkjet inks obtainable from a variety of commercial sources. It should be understood that each of these inks has a different formulation, even for different colors within the same ink family. Nonlimiting sources include Minnesota Mining and Manufacturing Company, Encad Corporation, Hewlett-Packard Corporation, DuPont, Inkware, Prizm, NuKote, and the like. These inks are preferably designed to work with the inkjet printers described immediately above and in the background section above, although the specifications of the printers and the inks will have to be reviewed for appropriate drop volumes and resolution in order to further refine the usefulness of the present invention.

Media of the present invention can also be employed with other jettable materials; that is, those materials capable of passing through an inkjet printing head. Nonlimiting examples of jettable materials include adhesives, particulate dispersions, waxes, electrically, thermally, or magnetically modifiable materials, biological fluids, chemical reagents, and combinations thereof.

The media of the present invention may contain, as desired, other print quality improvement additive materials, including mordants and surfactants, to improve printing or other additives to protect the media. These materials may be blended with the above defined polymers and processed to form microfibrillated materials as described above, or coated as a solution or dispersion onto the microfibrillated materials.

Thus, for example, an inkjet receptor medium of the present invention may contain mordants which can act as drying agents for dye-containing inks and pigment management agents for pigmented inks. Drying agents include an aromatic or aliphatic acid having sulfonic, carboxylic, phenolic, hydroxyl functional groups or a mixture of these functional groups. The drying agent, when combined with a multivalent inorganic salt and a surfactant, is capable of drying the medium to obtain a smudge-free rapidly dried image onto and in the medium when the image is printed.

Typical salts are alkali metal salts of aromatic acids such as, for example, sulfosalicylic acid, disulfosalicylic acid, sulfophthalic acid, sulfoisophthalic acid, sulfoterephthalic acid, disulfophenyldicarboxylic acid, sulfophenolic acid, hydroquinone sulfonic acid, hydroquinone disulfonic acid, sulfocarboxyphenolic acid, hydroxy-phthalic acid and combinations thereof.

Pigment management agents may also include multivalent metal salts which destabilize dispersants surrounding pigment particles and are not soluble in water after complexing with the dispersing aid that surrounds the pigment particles to provide a water fast image. Typical multivalent cations employed are those of Group IIA of the periodic table with counter ions such as sulfate, nitrate, bisulfate, chloride, aromatic carboxylates, and sulfocarboxylates. Particularly useful are aluminum sulfate and aluminum sulfophthalate.

A further additive for the receptor medium of the present invention is an organometallic salt of a multivalent metal cation and an organic acid anion. The metallic salt simultaneously releases the multivalent metal cation and the organic acid anion for both pigment management and ink drying. The metallic salt includes a multivalent metal derivative of an aromatic carboxylic, sulfocarboxylic, sulfophenolic acid, or combination thereof. The aromatic moiety can be a simple aromatic, a condensed aromatic, a heterocyclic aromatic or a combination thereof. The multivalent metal ion can be derived from Group IIA to VIA and Group IB to VIIIB of the periodic table. Typical metal ions include, but are not limited to, Al, Mg, Zn, Fe, Bi, Ga, Sr, Ca, Ti and Zr.

Surfactants can also be used as a print quality improvement additive, alone or in combination with one or more polymer or mordant additives. For example, the above salts may be combined as mentioned above with a surfactant. Surfactants may also, for example, be used to improve inkjet ink wetting on the microfibrillated material, and include non-ionic, anionic, cationic, zwitterionic or combinations thereof. Non-ionic surfactants may be fluorocarbon, hydrocarbon, or silicone based. Preferred surfactants increase the hydrophilicity of the microfibrillated materials and are particularly useful when water-based inkjet inks are employed. Examples of useful surfactants are described in U.S. Ser. No. 09/314,034, filed on May 18, 1999, and entitled "Macroporous Ink-Receiving Media".

In addition to the above, the receptor medium of the present invention may also contain free-radical scavengers, heat stabilizers, ultraviolet light stabilizers and inorganic fillers.

Free-radical scavengers can be present in an amount from about 0.05 to about 1.0 weight percent of the total microfibrillated material composition. Typically, scavengers include hindered amine light stabilizers (HALS), hydroxylamines, sterically hindered phenols, and the like. HALS compounds are commercially available from Ciba Specialty Chemicals under the trade designation "Tinuvin 292" and Cytec Industries under the trade designation "Cyasorb UV3581".

Heat stabilizers may be used to protect the resulting image graphic against the effects of heat. These are commercially available from Witco Corp., Greenwich, Conn. under the trade designation "Mark V 1923" and Ferro Corp., Polymer Additives Div., Walton Hills, Ohio under the trade designation "Synpron 1163", "Ferro 1237" and "Ferro 1720".

Ultraviolet light stabilizers may be present in small amounts ranging from about 0.1 to about 5 weight percent of the total microfibrillated material. Benzophenone type UV-absorbers are commercially available from BASF Corp., Parsippany, N.J. under the trade designation "Uvinol 400"; Cytec Industries, West Patterson, N.J. under the trade designation "Cyasorb UV 1164" and Ciba Specialty Chemicals, Tarrytown, N.Y. under the trade designations "Tinuvin 900", "Tinuvin 123" and "Tinuvin 1130".

Inorganic fillers may be used in the microfibrillated material as a preferred additive to impart one or more of desirable properties such as improved solvent absorption, improved dot gain and color density, and improved abrasion resistance. Typical fillers include silicates, e.g. amorphous silica, clay particles, aluminates, e.g. aluminum silicate, feldspar, talc, calcium carbonate, titanium dioxide, and the like. The particle size of these fillers is preferably less than one micron and may typically range from 0.5 to 0.2 microns.

The following examples further disclose embodiments of the invention.

EXAMPLES

Printing Methods

Two different methods for inkjet printing were employed for printing evaluations: piezoelectric inkjet printing using solvent-based inks and thermal inkjet printing using water-based inks.

A. Piezoelectric inkjet printing: Unless specified otherwise, a Xaar Jet XJ128-100 piezoelectric printhead (available from Xaar Ltd., Cambridge, England) on an x-y translational stage at 317 by 295 dpi was employed to print test patterns consisting of filled squares and circles as well as lines printed at 100%–400% coverage which were used to evaluate image quality. The inks used were "Scotchcal™ 3700" series solvent-based inks (available from 3M, St. Paul, Minn.), specifically 3791 magenta, 3792 yellow, 3795 black, 3796 cyan.

B. Thermal inkjet printing: Unless specified otherwise, a Deskjet 950C printer (available from Hewlett-Packard Company, Palo Alto, Calif.) at 300×600 dpi was used to print test patterns consisting of filled characters of various sizes printed at 100% coverage which were used to evaluate image quality. A c6578a color ink cartridge and a 51645A black ink cartridge (both available from Hewlett-Packard Company, Palo Alto, Calif.) were used.

Test Methods

Test Method 1—Draw Ratio Measurements

1-A: Uniaxially-oriented films: The draw ratios of calendered and length oriented films were calculated by dividing the roll output speed of the calender/length orienter by the input speed of the cast web.

1-B: Biaxially-oriented films: The machine direction (MD) and transverse direction (TD) draw ratios of biaxially oriented films were determined by inscribing equally spaced lines perpendicularly to both of the stretching directions and by calculating the corresponding ratio of the final line spacing to the initial spacing.

Test Method 2—Density Measurement and Void Content Determination

Densities of cast films and films after calendering and orienting were measure at 23° C. in deionized water according to the method of ASTM D792-86. Each film sample was weighed on a Mettler AG245 high precision balance (Mettler-Toledo, Inc., Highstown, N.J.) and placed underwater. The mass of the water displaced was measured using the density measurement fixture. The volume of water displaced by the sample was thereby determined and, in combination with the sample weight, used to calculate the sample density. The void content was then calculated as follows:

Calculated Void content={1-(final density/initial density)}×100 where the initial density is the density of the cast film before orientation, and the final density is the density of the oriented film.

Test Method 3: Image Quality Evaluation

Image quality was evaluated using the printing test patterns described above by observing resolution, ink feathering, inter-color bleed, color uniformity, edge sharpness, and overall appearance of the test pattern. Solid block color density (CD) was measured using a Gretag SPM-55 densitometer, available from Gretag-MacBeth AG, Regensdorf, Switzerland, where $D_K$, $D_M$, $D_C$, $D_Y$ are the solid block color densities of black, magenta, cyan, and yellow. No background subtraction was used, and the reported values were the average of three measurements. An increase in CD correlated to an increase or improvement in solid ink fill.

EXAMPLES

Comparative Example C1

This comparative example is a demonstration of solvent-based inkjet printing on a uniaxially oriented polypropylene film.

Sample Preparation:

A polypropylene film was prepared by extruding polypropylene homopolymer (Fina 3376X, available from Atofina Inc., Houston, Tex.) in a single screw extruder with a temperature of 260° C. at the end of the extruder, in the neck tube and die. The extruder was equipped with a 152 cm wide, single layer die having an orifice gapped to a nominal 2.54 mm. A film having a thickness of 1.78 mm was prepared using a three-roll stack casting station. In the three-roll stack, the chrome-coated stainless steel rolls were set to 88° C. The polymer melt exiting the extruder die entered the three-roll stack between the bottom and middle rolls, and after passing between the bottom and middle rolls, traveled over the middle roll into the nip formed by the middle and top rolls. After passing over the top roll, the resulting cast film exited the three-roll stack and was slit into two 61 cm wide films. The cast film had a density of 0.9 g/cm³ as determined by Test Method 2.

The cast film was calendered and length oriented as follows. The cast film was fed from an unwind station at a rate of 1.22 m/min, through two 145° C. preheat rolls and into the compressive nip of an "S-wrap" calender (rolls 1 and 2). Rolls 1 and 2 each had surface speeds of 1.31 m/min and 8.69 m/min, respectively, a temperature of 130° C. and 120° C., respectively, and a gap between the rolls of approximately 1 mm. The film exiting rolls 1 and 2 was further oriented as it passed over heated roll 3 and then heated roll 4 in an "S" configuration. Roll 3 had a surface speed of 17.89 m/min and a temperature of 140° C. Roll 4 had a surface speed of 17.95 m/min and a temperature of 140° C. The resulting film passed around a portion of roll 5, which was unheated and simply used to cool the film. The resulting calendered/length oriented film was wound onto a core under tension. The film was oriented to a draw ratio of 14.7:1 as determined by Test Method 1-A. The oriented film had a thickness of 165 micrometers and a width of 333 mm.

Print Image Quality:

The oriented film sample was printed upon using the Xaar piezoelectric inkjet printer as described above. Evaluation of the test pattern indicated that a series of thin lines printed at 100% and having widths of 0.25 mm and spaced 0.25 mm apart were capable of being resolved when printed upon the film. However, the low affinity of the ink with the smooth polypropylene surface caused the ink to coalesce and run when printing solid squares and circles, and there was also a high degree of intercolor bleed, resulting in very poor image quality. Although the ink coverage was non-uniform, it was possible to measure CDs in certain regions: $D_K$=1.37, $D_M$=0.94, $D_C$=0.95, $D_Y$=0.95 as described in Test Method 3. The surface remained extremely wet after printing, and when it eventually dried the ink could be easily scratched off the surface, especially in regions where the ink had coalesced to form a thicker layer.

Example 1

This example is a demonstration of solvent-based inkjet printing on a fully microfibrillated, uniaxially oriented polypropylene substrate.

Sample Preparation:

A polypropylene film was prepared by extruding polypropylene homopolymer (Fina 3374X, available from Atofina Inc., Houston, Tex.) in a single screw extruder with a temperature of 232° C. at the end of the extruder, in the neck tube, and die. The extruder was equipped with a 25.4 cm wide, single layer die having an orifice gapped to a nominal 1.27 mm. A film having a thickness of 1.45 mm and a width of 231 mm was extruded onto a chrome-coated stainless steel roll that was set to 118° C. The resulting cast film had a density of 0.9 gram/cm³ as determined by Test Method 2.

The cast film was calendered and length oriented as follows. The cast film was fed from an unwind station through a series of idler rolls and into the compressive nip of a calender (rolls 1 and 2). Rolls 1 and 2 had temperatures of 100° C. and 140° C., respectively. The film exiting rolls 1 and 2 was oriented as it passed over heated roll 3 and then heated roll 4 in an "S" configuration. Rolls 3 and 4 both had a temperature of 140° C. The resulting film passed around a portion of roll 5, which was unheated and simply used to cool the film. The resulting calendered/length oriented film was wound onto a core under tension. The film was oriented to a draw ratio of 17.8:1 as determined by Test Method 1-A.

The oriented film was then microfibrillated on both major surfaces using a hydroentangler (Hydrolace 350 System™, available from CEL International LTD., Coventry, England) operated at a system water pressure of 20 MPa and equipped with 7 water jet heads. The first jet head was configured with a jet strip having 16.5 orifices/cm, with each orifice dimensioned at 110 µm. The second through forth jet heads were configured with jet strips having 11 orifices/cm, with each orifice dimensioned at 150 µm. The fifth jet head was configured with a jet strip having 16.5 orifices/cm, with each orifice dimensioned at 110 µm. The sixth and seventh jet heads were configured with jet strips having 14 orifices/cm, with each orifice dimensioned at 130 μm. The oriented film was conveyed perpendicularly to the jet heads (4 above the film and 3 below) at a speed of 2 m/min.
Image Quality:
The resulting microfibrillated material was printed upon using the Xaar piezoelectric inkjet printer as described above. Evaluation of the test pattern indicated that a series of lines printed at 100% and having widths of 0.35 mm and spaced 0.35 mm apart were resolved on this substrate. The microfibrillated surface kept the amount of feathering and intercolor bleed to a minimum; for only at ink lay down of 300% or more was there a small but detectible indication of ink feathering. The ink coverage on the surface was quite uniform with no mottling or coalescing. The CDs were measured to be $D_K=0.61$, $D_M=0.54$, $D_C=0.48$, $D_Y=0.54$ as described in Test Method 3. It was observed that the surface of the substrate felt dry to the touch immediately after printing, and the colors are held fast to the surface. Thus, although this specimen had somewhat lower thin line resolution and CD than C1, the overall imaging quality was far superior because there was no bleeding or mottling and the ink dried quickly and uniformly and held fast to the polypropylene surface. These observations indicate how microfibrillation of the oriented polypropylene film significantly improved the inkjet printing performance.

Comparative Example C2

This comparative example is a demonstration of water-based inkjet printing on a uniaxially oriented polypropylene film.
Sample Preparation: Polypropylene film was prepared by extruding polypropylene homopolymer (Fina 3374X, available from Fina Inc., Dallas, Tex.) with 0.01% of a gamma-quinacridone (Hostaperm Red E3B pigment, available from Clariant GmbH, Frankfurt, Germany) beta-nucleating agent in a single screw extruder with a temperature of 232° C. at the end of the extruder, in the neck tube and die. The extruder was equipped with a barrier screw having a mixing tip and with a 12.7 cm wide, single layer die having an orifice gapped to a nominal 1.27 mm. A film having a thickness of 1.68 mm and a width of 124 mm was prepared using a three-roll stack casting station. In the three-roll stack, the bottom chrome-coated stainless steel roll was set to 99° C., the middle chrome-coated stainless steel roll was set to 99° C., and the top silicon rubber roll was cooled with 7° C. water. The polymer melt exiting the extruder die entered the three-roll stack between the bottom and middle rolls, and after passing between the bottom and middle rolls, traveled over the middle roll into the nip formed by the middle and top rolls. After passing over the top roll, the resulting cast film exited the three-roll stack. During film preparation, the silicon rubber roll heated up to near the temperature of the middle roll. The cast film had a density of 0.9 gram/cm$^3$ as determined by Test Method 2.

The cast film was calendered and length oriented as follows. The cast film was fed from an unwind station into the compressive nip of a calender (rolls 1 and 2). Rolls 1 and 2 each had a surface speed of 1.2 m/min, a temperature of 149° C., and a gap between the rolls set to approximately 0.15 mm. The film exiting rolls 1 and 2 was further oriented as it passed through a nipped set of unheated rolls (rolls 3 and 4). Rolls 3 and 4 had a surface speed of 5.03 m/min. The resulting calendered/length oriented film was wound onto a core under tension. The film was oriented to a draw ratio of 22:1 as determined by Test Method 1-A. The oriented film had a thickness of 142 micrometers, a width of 81 mm, and a density of 0.73 gram/cm$^3$. The film was calculated to contain 18.5% voids as determined by Test Method 2.

Image Quality:
The oriented film was printed upon using the HP Deskjet 950C inkjet printer as described above. The colored inks tended to be very mottled due to poor spreading of the water on the polypropylene surface. The spreading of the black ink was even worse, causing it to coalesce into small droplets on the polypropylene surface. In addition, there was significant feathering and inter-color bleed. The ink remained wet to the touch even after 1 hour of printing, and was easily smeared even when completely dry.

Example 2

This example is a demonstration of water-based inkjet printing on the microfibrillated surface of a uniaxially oriented polypropylene film.
Sample Preparation:
A film was cast and oriented in a manner identical to Comparative Example C2 but microfibrillated on only one major surface (i.e. not completely through) using the hydroentangler described in Example 1 operated at a system water pressure of 10 MPa 4 and using only 3 of the 7 water jet heads. The second and third jet beads were configured with jet strips having 20 orifices/cm, with each orifice dimensioned at 90 μm. The fourth jet head was configured with a jet strip having 20 orifices/cm, with each orifice dimensioned at 110 μm. The oriented film was conveyed perpendicularly to the jet heads (3 above the film) at a speed of 1.5 m/min. This process was repeated 4 times.
Image Quality:
The resulting microfibrillated material was printed upon using the HP Deskjet 950C inkjet printer as described above. In contrast to the non-fibrillated film of Comparative Example C2, both the colored and black inks uniformly covered the surface with minimal inter-color bleed and sharp edges with little feathering. Furthermore, the colored inks were dry to the touch after 15 minutes, and the black ink was dry within 1 hour after printing. In addition, the inks did not smear after drying. Thus, an improvement in the inkjet printing quality of oriented polypropylene was achieved even when only the surface of the film was microfibrillated.

Example 3

This example is a demonstration of piezoelectric inkjet printing on a microfibrillated surface of a uniaxially oriented polypropylene film using UV curable ink.
Sample Preparation:
A film was cast and oriented in a manner identical to C1 but microfibrillated on only one major surface using the hydroentangler described in Example 1 operated at a system water pressure of 20 MPa and using only 3 of the 7 water jet heads. These jet heads were each configured with a jet strip having 20 orifices/cm, with each orifice dimensioned at 60 μm. The oriented film was conveyed perpendicularly to the jet heads (3 above the film) at a speed of 1.5 m/min. This process was repeated 4 times.
Image Quality:
The resulting microfibrillated surface of the film was printed upon using the Xaar Jet piezoelectric inkjet printhead described above with a UV curable ink. The ink containing the components listed in Table 1 was prepared according to the following general procedure. A dispersion was first prepared by pre-dissolving the dispersant in the liquid components and then adding the pigment powder. Initial wetting of pigment was accomplished with high shear mixing. Next, the dispersion was subjected to high energy milling in order to reduce the particle size to less than 0.5

μm. The dispersion and all remaining components of the ink composition were then placed together in ajar and thoroughly mixed until all soluble ingredients were completely dissolved. Immediately after the resulting ink was printed on the microfibrillated surface, the printed ink was cured using a Fusion Systems UV processor (available from Fusion Systems Inc., Gaithersburg, Md.) at 100% power, equipped with an H bulb at a total dosage of 480 mJ/cm$^2$ in two passes. After curing, it was observed that there was no feathering and the ink spread uniformly on the polypropylene surface with no mottling or coalescence.

TABLE 1

UV Curable Ink Composition

| Component[1] | Weight % |
|---|---|
| Benzophenone | 2 |
| IPTX | 1 |
| Irgacure 369 | 2 |
| Irgacure 651 | 2 |
| Irgacure 819 | 5 |
| T-4 Morpholine Adduct | 4 |
| Stabaxol I | 0.9 |
| Tinuvin 292 | 2 |
| NVC | 5 |
| HDDA | 5 |
| IOA | 25.1 |
| IBOA | 5 |
| EEEA | 6 |
| THFFA | 3 |
| Ebecryl 80 | 5 |
| Ebecryl 284 | 7 |
| Magenta dispersion[2] | 20 |

See component descriptions in Table 2.
[2]Magenta dispersion: 33.3 wt % Monastral Red RT-343-D pigment, 11.55 wt % Solsperse 32000, 55.45 wt % THFFA.

TABLE 2

Description of Components in UV Curable Ink

| Chemical Name/ Description | "Trade Designation" or Abbreviation | Source | Location |
|---|---|---|---|
| Monomers | | | |
| 2-(2-Ethoxyethoxy)ethyl acrylate | EEEA | Sartomer Co. | Exton, PA |
| Isobornyl acrylate | IBOA | Sartomer Co. | Exton, PA |
| 1,6-Hexanediol diacrylate | HDDA | Sartomer Co. | Exton, PA |
| Tetrahydrofurfuryl acrylate | THFFA | Sartomer Co. | Exton, PA |
| N-vinyl caprolactam | NVC | BASF | Ludwigshafen, Germany |
| Isooctyl acrylate | IOA | Sartomer Co. | Exton, PA |
| Oligomers | | | |
| Aliphatic urethane diacrylate diluted with 12% HDDA | "Ebecryl ™ 284" | UCB Chemicals | Smyrna, GA |
| Modified polyester acrylate | "Ebecryl ™ 80" | UCB Chemicals | Smyrna, GA |
| Photoinitiators/Synergists | | | |
| Bis(2,4,6-trimethylbenzoyl) phenylphosphine oxide | "Irgacure ™ 819" | Ciba Specialty Chemicals | Tarrytown, NY |

TABLE 2-continued

Description of Components in UV Curable Ink

| Chemical Name/ Description | "Trade Designation" or Abbreviation | Source | Location |
|---|---|---|---|
| 2,2-Dimethoxy-1,2-diphenyl-ethan-1-one | "Irgacure ™ 651" | Ciba Specialty Chemicals | Tarrytown, NY |
| 2-Benzyl-2-dimethylamino-1-(4-morpholinophenyl)butan-1-one | "Irgacure ™ 369" | Ciba Specialty Chemicals | Tarrytown, NY |
| Benzophenone Isopropyl-thioxanthone | Benzophenone "IPTX" | Sartomer Co. Aceto Corp. | Exton, PA New Hyde Park, NY |
| Tetraethyleneglycol bis(3-morpholino-propionate) | T-4 Morpholine Adduct† | — | — |
| Stabilizers | | | |
| A mixture of bis(1,2,2,6,6-pentamethyl-4-piperidinyl)-sebecate and 1-(Methyl)-8-(1,2,2,6,6-pentamethyl-4-piperidinyl)-sebecate | "Tinuvin ™ 292" | Ciba Specialty Chemicals | Tarrytown, NY |
| 2,2',6,6'-Tetraisopropyl-diphenyl carbodiimide | "Stabaxol ™ I" | Rhein Chemie Corp | Trenton, NJ |
| Pigment | | | |
| Magenta pigment | "Monastral Red RT-343-D" | Ciba-Geigy Corp. | Tarrytown, NY |
| Dispersant | | | |
| High molecular weight polyurethane | "Solsperse ™ 32000" | Zeneca Inc. | Wilmington, DE |

†T-4 Morpholine Adduct was prepared as follows: A partial vacuum (approximately 63 cm water vacuum) was pulled on a clean 1-Liter flask having an addition buret and stirring rod attached. The flask was preheated to 37.8° C.. Tetraethylene glycol diacrylate (256 g) was added to the flask with mixing at a moderate rate (approximately 70 rpm). The liquid was allowed to come up to temperature. Morpholine (155 g) was added to the flask at such a rate that the temperature did not exceed 46.1° C.. The temperature control bath was set for 43.3° C. and the flask contents were mixed for 30 minutes. The vacuum on the flask was broken and the fluid reaction product (T-4 morpholine) was decanted through a 25 micron filter into a container.

Comparative Example C3

This example is a demonstration of water-based inkjet printing on a biaxially oriented coextruded (bilayer) substrate.
Sample Preparation:
A two-layer film was cast by coextrusion and oriented using conventional film orientation techniques. The first layer was a blend of about 28% by weight of Fina 3230 polypropylene (Fina Inc., Dallas, Tex.) having a melt flow index of 1.6 (determined according to ASTM D-1238, Condition "L") and about 72% by weight dried, extrusion grade polyethylene terephthalate (PET, available from 3M Company, St. Paul, Minn.), with an intrinsic viscosity (I.V.) of about 0.58 dL/g. This blend was fed to the input of a 20 cm extruder using a volumetric feeder to control the rate of addition of the polypropylene. The total feed rate of the first (blend) layer was about 585 kg/hr. The second layer was dried, extrusion grade polyethylene terephthalate (PET), with an intrinsic viscosity (I.V.) of about 0.58 dL/g, fed to the input of a 9 cm extruder. The total feed rate of the second (PET) layer was about 166 kg/hr. A filter for particulate control and a gear pump for flow rate control were installed after the extruder gate for both of the extruders. The first and second layers were combined using a 2-layer feedblock attached to a 94 cm wide sheeting die with a die gap of about 0.14 cm. The sheet formed by the die was cast onto a temperature-controlled casting wheel maintained at a temperature of about 16° C. The sheet was cast such that the second (PET) layer was against the casting wheel. The cast sheet was held in place by electrostatic pinning.

A biaxially oriented film was then made using conventional polyester biaxial orientation equipment to stretch the resulting cast sheet in the machine direction (MD) about 3.2 times at a temperature of about 83° C. and then to stretch the film in the transverse direction (TD) about 3.7 times at a temperature of about 103° C. The stretched film was then subjected to a heat set temperature of about 252° C. while the film was restrained. The thickness of the resulting finished oriented film was about 0.13 mm.

Electron microscopy of the cast web revealed that the polypropylene in the first (blend) layer formed discrete domains in a continuous PET matrix in the first (blend) layer. Under the described processing conditions, voids formed at the interface between the discrete polypropylene domains and the continuous PET matrix in the first (blend) layer during film orientation. The finished film density was an indicator of the amount of voiding present in the first (blend) layer. The density of the finished (oriented) film was about 0.83 g/cm$^3$ by Test Method 2.

Image Quality:

The oriented film was printed upon using the HP Deskjet 950C inkjet printer as described above. The colors on the film were very mottled due to the poor spreading of the water-based ink on the PET/PP surface. In addition, there was a large amount of inter-color bleed and poorly resolved edges due to feathering. Furthermore, the surface was wet to the touch for more than after 3 hours after printing, and the ink was easily smeared even when dried.

Example 4

This example is a demonstration of water-based inkjet printing on a microfibrillated surface of a biaxially oriented coextruded (bilayer) substrate.

Sample Preparation:

A film was cast and oriented in a manner identical to Comparative Example C3 but microfibrillated on only one major surface using the hydroentangler described in Example 1 operated at a system water pressure of 8 MPa and using only 1 of the 7 water jet heads with the polymer blend side toward the water-jets. The jet head was configured with a jet strip having 20 orifices/cm, with each orifice dimensioned at 110 $\mu$m. The oriented film was conveyed perpendicularly to the jet heads (1 above the film) at a speed of 2.5 m/min.

Image Quality:

The resulting microfibrillated surface of the film was printed upon using the HP Deskjet 950C inkjet printer as described above. In contrast to the non-fibrillated material of Comparative Example C3, the substrate was covered uniformly by the ink with no mottling and only a small amount of inter-color bleed and feathering, most noticeable with the black ink. In addition, the surface was dry to touch after 4 minutes and did not smear after drying. Thus, surface microfibrillation of a biaxially oriented PET/Polypropylene blend significantly improved the inkjet printing quality.

Comparative Example 4

This example is a demonstration of solvent-based inkjet printing on a biaxially oriented film comprised of polypropylene, an inorganic filler, and a styrenic thermoplastic elastomer.

Sample Preparation:

A 75 g batch of 40 weight % polypropylene homopolymer (Fina 3376 available from Atofina Inc., Houston, Tex.) with 40 weight % calcium metasilicate (wollastonite grade 520H available from Fibertec Inc., Bridgewater, Mass.) and 20 weight % styrenic block copolymer (Vector® 4114 available from Dexco Polymers, Plaquemine, La.) was compounded at 200° C. in a Plasti-Corder Laboratory batch mixer (type DR-2051, manufactured by C. W. Brabender Instruments, Inc., South Hackensack, N.J.) until melted (roughly three to five minutes at 50 to 100 RPM). The resulting mixture was then pressed into a sheet between metal platens, using a 0.091 cm spacer shim, in a hot press (model G-30H-1S-LP manufactured by Wabash MPI, Wabash, Ind.) at 200° C. under a load of 454 kg for 3 min, followed by pressing under a load of 18,160 kg for an additional 30 seconds, and finally quenched between cold clamps cooled with running tap water for 3 minutes. The density of the resulting pressed sheet was 1.23 g/cm$^3$ as determined by Test Method 2.

From the pressed sheet, 85 mm×85 mm square specimens were cut out and biaxially oriented in a Karo IV Laboratory Stretcher (manufactured by Brückner Maschinenbau GmbH, Siegsdorf, Germany) at 150° C. A simultaneous balanced stretch at 3.1 m/min in both the machine direction (MD) and the transverse direction (TD) was employed, resulting in a final biaxial draw ratio of 3.5×3.5 (MD×TD) as determined by Test Method 1-B. The resulting oriented film had a thickness of approximately 0.20 mm and a density of 0.30 g/cm$^3$, indicating a void content of 75.6% as per Test Method 2.

Image Quality:

The oriented film was printed upon using a Xaar piezoelectric inkjet printhead described above. The ink coverage on the surface was uniform with no significant mottling, but some feathering was evident which made the edges of the squares and circles lose definition and appear blurry. Evaluation of the test pattern indicated that a series of thin lines printed at 100% and having widths of 0.68 mm and spaced 0.68 mm apart are capable of being resolved when printed upon the substrate. The value of $D_K$ was measured to be 1.07 using Test Method 3.

Example 5

This example shows solvent-based inkjet printing on the microfibrillated surface of a biaxially oriented film comprised of polypropylene, and inorganic filler, and a thermoplastic elastomer.

Sample Preparation:

A film was prepared in a manner identical to C4 but microfibrillated on only one major surface using the hydroentangler described in Example 1 and using only 1 of the 7 water jet heads. The jet head was configured with a jet strip having 20 orifices/cm, with each orifice dimensioned at 60 $\mu$m. The oriented film was conveyed perpendicularly to the jet heads (1 above the film) at-a speed of 1.5 m/min. This process was followed 1 time while operating at a system water pressure of 10 MPa and repeated 2 additional times while operating at a system water pressure of 15 MPa and 2 further times while operating at a system water pressure of 20 MPa.

Image Quality:

The resulting microfibrillated surface of the film was printed upon using a Xaar piezoelectric inkjet printhead as described above. The ink coverage on the surface was uniform with no significant mottling, and there was significantly less feathering than that found on the non-fibrillated material of Comparative Example C4, making the edges of the squares and circles look sharper. Evaluation of the test pattern indicated that a series of thin lines printed at 100% and having widths of 0.35 mm and spaced 0.35 mm apart were resolved, a distinct improvement over the non-fibrillated surface of Comparative Example C4. However, a $D_K$ of 0.84 was measured by Test Method 3, which was markedly lower than the non-fibrillated surface.

Examples 6–12 (Solvent-based Printing Image Quality Improvement)

As described in Example 1 and Comparative Example C1, as well as Example 5 and Comparative Example C4, the CD of the polypropylene-based oriented materials tended to be low when printed with solvent-based inks and decreased further when microfibrillated. It was found that by blending certain additives into the cast film or by applying surface coatings it was possible to improve the color density of the microfibrillated surface when printed with solvent-based inks.

Unless specified otherwise, the following microfibrillated films prepared as described below were printed upon using a Xaar Jet piezoelectric inkjet printhead as described above. The ink used was a mixture of two "Scotchcal 3700" series solvent-based piezoelectric ink jet inks (available from 3M, St. Paul, Minn.), specifically a 1:1 ratio of magenta (Scotchcal™ 3791) and yellow (Scotchcal™ 3792) to form a red colored ink. The test pattern used to evaluate color density consisted of a solid filled octagon and characters printed at 100%. The CD values were measured as described in Test Method 3 and are reported in TABLE 3. An increase in CD correlates to an improvement in solid ink fill.

Sample Preparation:

Example 6

A surface microfibrillated, uniaxially oriented polypropylene film was prepared in a manner identical to Example 3.

Example 7

A surface microfibrillated, uniaxially oriented substrate derived from a microlayer blend of polypropylene and a maleated-polypropylene was prepared as follows.

A microlayer cast web was made using three commercially available single flat screw extruders connected to a feedblock and skinblock. No gear pumps, melt filtration, or static mixers were used. The feedblock was a 61 layer unit. It has two input ports designated A and B and generated a 61 layer A-B-A-B . . . -B-A non-graded stack. That is, all A layers had the same thickness, and all B layers had the same thickness, but A and B layer thicknesses were not necessarily equal. The skin block divided the input skin stream into two nominally equal flows and applied a skin layer to the top and bottom of the multi-layer stack. The composite stream then flowed through a die adapter to generate the stream required for input to the die, a 12" wide, single layer die with orifice gapped to a nominal 0.050". All melt stream components were heated to 244° C. The die was set 0.254 cm directly above a cast wheel cooled to 24° C. The skins were polypropylene homopolymer (Fina 3376 available from Atofina Inc., Houston, Tex.). For the alternating A-B layers, the A layers were the same polypropylene homopolymer. The B layers were composed of a blend of 97 weight % polypropylene homopolymer (Fina 3376) and 3 weight % maleated polypropylene (Epolene® G3003, available from Eastman Chemical Company, Kingsport, Tenn.).

The resulting cast film was calendered and length oriented as follows. The cast film was fed from an unwind station, through a series of idler rolls and into the compressive nip of a calender (rolls 1 and 2). Rolls 1 and 2 were both set to a temperature of 100° C., and a calender nip force of 22 kN. The film exiting rolls 1 and 2 was further oriented as it passed over heated roll 3 and then heated roll 4 in an "S" configuration, both held at 130° C. The resulting film passed around a portion of roll 5, which was unheated and simply used to cool the film. The resulting calendered/length oriented film was wound onto a core under tension. The film was oriented to a draw ratio of 12:1 as determined by Test Method 1-A The oriented film was then microfibrillated on both major surfaces using a the Hydrolace hydroentangler operated at a system water pressure of 15 MPa and equipped with 7 water jet heads. The first jet head was configured with a jet strip having 16.5 orifices/cm, with each orifice dimensioned at 110 µm. The second through forth jet heads were configured with jet strips having 11 orifices/cm, with each orifice dimensioned at 150 µm. The fifth jet head was configured with a jet strip having 16.5 orifices/cm, with each orifice dimensioned at 110 µm. The sixth and seventh jet heads were configured with jet strips having 14 orifices/cm, with each orifice dimensioned at 130 µm. The oriented film was conveyed perpendicularly to the jet heads (4 above the film and 3 below) at a speed of 5 m/min.

Example 8

A surface microfibrillated, biaxially oriented substrate comprised of a blend of polypropylene with an inorganic filler and an acid/acrylate modified olefin resin was prepared as follows.

In the same manner as described in Comparative Example C4, a film containing 40 weight % polypropylene homopolymer (Fina 3376 available from Atofina Inc., Houston, Tex.) with 40 weight % calcium metasilicate (wollastonite grade 800H available from Fibertec Inc., Bridgewater, Mass.) and 20 weight % of an acid-acrylate modified ethylene vinyl acetate copolymer (Bynel™ 3101 available from DuPont Packaging and Industrial Polymers, Wilmington, Del.) was compounded and melt pressed.

The resulting pressed sheet was biaxially oriented in the Karo IV lab stretcher at 155° C. with draw ratios of 3.5×3.5 (MD×TD) in a similar manner to that described in Comparative Example C4.

The resulting biaxially oriented film was exposed to an array of high pressure water jets using a lab scale hydroentangler (70 cm wide, S/N 101, Project# 2303: manufactured by Honeycomb Systems Inc., Biddeford, Me.) operating at approximately 10 MPa water pressure. The water jet orifices were 110 micrometers in diameter, with 15.75 orifices/cm. The oriented film was taped onto a solid plastic sheet that was transported by a conveyor belt moving 3 m/min perpendicularly beneath the array of water jets. The oriented film was passed two times beneath the water jets and exposed on one side only.

Example 9

A surface microfibrillated, biaxially oriented substrate comprised of a blend of polypropylene with an inorganic filler and a thermoplastic polyester elastomer was prepared as follows.

In the same manner as described in Comparative Example C4, a film containing 40 weight % polypropylene homopolymner (Fina 3376 available from Atofina Inc., Houston, Tex.) with 40 weight % calcium metasilicate (wollastonite grade 800H available from Fibertec Inc., Bridgewater, Mass.) and 20 weight % of a thermoplastic elastomer copolyester having crystalline polybutylene terephthalate hard segment with amorphous glycol soft segments (Hytrel™ G3548W available from E. I. duPont de Nemours & Co., Wilmington, Del.) was compounded and melt pressed. The resulting pressed sheet was biaxially oriented as in Comparative Example C4. The resulting biaxially oriented film was microfibrillated as in Example 8.

Example 10

A surface microfibrillated, biaxially oriented substrate comprised of a blend of polypropylene with an inorganic filler and a terpolymer of ethylene/vinyl acetate/carbon monoxide was prepared as follows.

In the same manner as described in Comparative Example C4, a film containing 40 weight % polypropylene homopolymer (Fina 3376 available from Atofina Inc., Houston, Tex.) with 40 weight % calcium metasilicate (wollastonite grade 800H available from Fibertec Inc., Bridgewater, Mass.) and 20 weight % of a terpolymer of ethylene/vinyl acetate/carbon monoxide (Elvaloy® 741 available from DuPont Packaging and Industrial Polymers, Wilmington, Del.) was compounded and melt pressed. The resulting pressed sheet was biaxially oriented as in Comparative Example C4. The resulting biaxially oriented film was microfibrillated as in Example 8.

TABLE 3

Solid Block Color Densities of Various Solvent-Based Inkjet Printed Samples

| Example | $D_K$ | $D_M$ | $D_C$ | $D_Y$ |
|---|---|---|---|---|
| 6 | 0.30 | 0.48 | 0.02 | 0.50 |
| 7 | 0.314 | 0.535 | 0.106 | 0.542 |
| 8 | 0.418 | 0.773 | 0.146 | 0.855 |
| 9 | 0.42 | 0.75 | 0.158 | 0.759 |
| 10 | 0.422 | 0.782 | 0.148 | 0.786 |

The results in Table 3 show that the addition of certain polymers to the polypropylene base material (Examples 7–10) significantly improved the image quality of the microfibrillated substrates, especially with respect to color density, compared with that found for the pure polypropylene microfibrillated, oriented film of Example 6.

Example 11

Solvent-based inkjet printing was performed on a fully microfibrillated, uniaxially oriented polypropylene material that was hydroentangled with a polypropylene non-microfiber nonwoven fabric backing.

Sample Preparation:

A polypropylene film was prepared by extruding polypropylene homopolymer (Fina 3371, available from Atofina Inc., Houston, Tex.) as described in Comparative Example C1. The resulting cast film was calendered and length oriented in a manner similar to as described in Comparative Example C1 to a draw ratio of approximately 20:1. The resulting oriented film was microfibrillated in a manner similar to as described in Example 1, but during the process, the oriented film was placed on top of a spunbond polypropylene nonwoven fabric (AVGOL™, 15 g/m², available from Avgol Ltd., Holon, Israel), and the two were hydroentangled together to form a single hybrid nonowoven.

Image Quality:

The microfibrillated hybrid material was printed upon using the Xaar piezoelectric inkjet printer as described above. Similarly to Example 1, evaluation of the test pattern indicated that a series of lines printed at 100% and having widths of 0.35 mm and spaced 0.35 mm apart were resolved. Likewise, there was only a minimal amount of edge roughness, and the ink coverage on the surface was quite uniform with no mottling or coalescing. The color density of the black ink was measured to be 0.79 as described in Test Method 3.

Example 12

Solvent-based inkjet printing was performed on a fully microfibrillated, uniaxially oriented polypropylene material hydroentangled with a polypropylene non-woven fabric and coated with an acrylic primer.

Sample Preparation:

The identical microfibrillated hybrid nonwoven of Example 11 was prepared and coated with a 15 weight % solution of an acrylic resin composed of poly(methyl methacrylate) and poly(butyl methacrylate) (Paraloid® B-66 available from Rohm and Haas, Co., Philadelphia, Pa.) in 2-butoxyethyl acetate (Scotchcal™ Thinner CGS50, available from 3M, St. Paul, Minn.) using a #6 wire wound rod and dried in a convection oven at 60° C.

Image Quality:

The coated substrate was printed in the same manner as Example 11. The acrylic coating improved the image quality by increasing the color density from 0.79 to 1.16. In addition, the coated surface appeared to provide sharper edges than Example 11. It was also observed that the acrylic coating tended to make the material feel significantly stiffer.

Comparative Examples C5–C10 and Example 13

The following example and comparative examples provide a comparison of solvent-based piezoelectric inkjet printing on a microfibrillated substrate with other substrates.

Comparative Example C5 (Piezoelectric Inkjet Printing on a PVC Film)

A vinyl film (VCC-9929 available from 3M Company, St. Paul, Minn.) was cleaned with isopropyl alcohol to remove any contaminants and then printed upon using the Xaar piezoelectric inkjet printer as described above. The ink coverage on the surface was uniform with no significant mottling, but feathering and inter-color bleed was evident, especially at high ink lay down (>300%) which made the edges of these squares and circles lose some definition and appear blurry. Evaluation of the test pattern indicated that a series of thin lines printed at 100% and having widths of 0.35 mm and spaced 0.35 mm apart were resolved. It was observed that the ink was still very wet after printing.

Comparative Example C6 (Piezoelectric Inkjet Printing on a Polypropylene Meltblown Nonwoven Fabric)

A polypropylene microfiber was meltblown to form a nonwoven fabric web having a basis weight of 40 g/m². The average Effective Fiber Diameter (EFD) of the fibers in the web was calculated, using an air flow rate of 32 L/min according to the method described in Davies, C. N., "The Separation of Airborne Dust and Particles," Institution of Mechanical Engineers, London, Proceedings 1B, 1952, to be 3.9 μm. The nonwoven fabric was printed upon using the Xaar piezoelectric inkjet printer as described above. The ink coverage on the surface was uniform with no significant mottling, but a high degree of feathering and inter-color bleed was evident due to the wicking of ink along fiber strands. Evaluation of the test pattern indicated that a series of thin lines printed at 100% and having widths of 0.50 mm and spaced 0.50 mm apart were resolved. It was observed that the ink was dry to the touch after printing.

Vertical Hang Test: To evaluate the solvent-based ink's uptake on the nonwoven fabric surface, a portion of the sample was printed with Scotchcal™ 3795 black at 1,000% ink fill in a 2.54 cm×2.54 cm square and hung vertically immediately after printing. It was observed that the edges of the square showed a substantial amount of wicking after printing, but after hanging for 30 minutes, there was no additional bleeding and the image retained its original shape.

Comparative Example C7 (Piezoelectric Inkjet Printing on a Woven Cotton Cloth)

A commercially available woven cotton cloth (TexWipe® TX309 available from Texwipe Company Upper Saddle River, N.J.) having a basis weight of 180 g/m$^2$ was printed upon using the Xaar piezoelectric inkjet printer as described above. As with Comparative Example C6, the ink coverage on the surface was uniform with no significant mottling, but a high degree of feathering and inter-color bleed was evident due to the wicking of ink along fiber strands, especially at high ink lay down (>300%). Evaluation of the test pattern indicated that a series of thin lines printed at 100% and having widths of 0.35 mm and spaced 0.35 mm apart were resolved. It was observed that the ink was dry to the touch after printing.

Comparative Example C8 (Piezoelectric Inkjet Printing on Standard Paper)

Commercially available paper (Hammermill® CopyPlus Standard White, available from International Paper, Stamford, Conn.) having a basis weight of 36.3 kg was printed upon using the Xaar piezoelectric inkjet printer as described above. The ink coverage on the surface was uniform with no significant mottling. At high ink lay down (>300%) it was observed that there was feathering. Evaluation of the test pattern indicated that a series of thin lines printed at 100% and having widths of 0.35 mm and spaced 0.35 mm apart were resolved. It was observed that the ink was dry to the touch after printing.

Comparative Example 9 (Piezoelectric Inkjet Printing on PVC Film)

A vinyl film (C3555 available from 3M Company, St. Paul Minn.) was surface was cleaned with isopropyl alcohol to remove any contaminants and then printed upon using the Xaar piezoelectric inkjet printer as described.

Vertical Hang Test: To evaluate the solvent-based ink's uptake on the PVC surface, a portion of the sample was printed using Scotchcal™ 3795 black at 1,000% ink fill in a 6.5 cm×6.5 cm square and hung vertically immediately after printing. It was observed that after hanging for 30 minutes there was a large quantity of ink running down the film.

Ink Drying Test: To evaluate the solvent-based ink's drying time on the PVC film, portions of the sample were printed using black at 100% ink fill in a 2.54 cm×2.54 cm square and tested for dryness at various time intervals by pressing lightly on the printed surface with a white piece of paper. It was observed that 3 minutes after printing, there was a significant amount of ink transferred to the paper. The amount of ink transferred was even greater than the amount transferred from the microfibrillated surface of Example 13 (see below) immediately after it was printed, indicating that the PVC surface dried at lower rate than the microfibrillated surface.

Comparative Example C10

In this example inkjet printing was performed on a biaxially oriented film comprised of a blend of polypropylene with inorganic filler, a terpolymer of ethylene/vinyl acetate/carbon monoxide, and a styrenic thermoplastic elastomer.

Sample Preparation:

A film having a composition of 30 weight % polypropylene homopolymer (Fina 3376 available from Atofina Inc., Houston, Tex.) with 40 weight % calcium metasilicate (wollastonite grade 800H available from Fibertec Inc., Bridgewater, Mass.), 20 weight % of a terpolymer of ethylene/vinyl acetate/carbon monoxide (Elvaloy® 741 available from DuPont Packaging and Industrial Polymers, Wilmington, Del.) and 10 weight % polystyrene/polyisoprene (Vector 4114, available from Dexco Polymers, Plaquemine, La.) was cast using a twin screw extruder with a temperature of 175° C. at the end of the extruder, 185° C. in the neck tube and 195° C. at the die. The extruder was equipped with a 30.5 cm wide die having an orifice gapped to a nominal 1 mm. The polymer melt exiting the extruder die entered a three-roll stack between the bottom and middle rolls, and after passing between the bottom and middle rolls, traveled over the middle roll into the nip formed by the middle and top rolls. In the three-roll stack, the bottom and middle rolls were chrome-coated stainless steel set to 82° C. The resulting film had a thickness of 1 mm and a density of 1.23 g/cm$^3$ as determined by Test Method 2.

This cast film was oriented sequentially using a length orienter (LO) (available from Killian, a division of Davis-Standard Corp., Cedar Grove, N.J.) and tenter (available from Bruckner, France) at a draw ratio of 3.0 in the machine direction (MD) and 2.0 in the transverse direction (TD) as determined by Test Method 1-B. The temperature of the LO rolls was 130° C. and the tenter zones were all 163° C. The density of the resulting 318 μm thick biaxially oriented film was 0.77 g/cm$^3$ indicating a void content of 37.4% as determined by Test Method 2.

Image Quality:

The biaxially oriented film was printed upon using the Xaar piezoelectric inkjet printer as described above. The ink coverage on the surfaces was uniform with no mottling, but some feathering was evident at higher ink lay down (>300%) that made edges lose definition and appear blurry. Evaluation of the test pattern indicated that a series of lines printed at 100% and having widths of 0.35 mm and spaced 0.35 mm apart were resolved.

Example 13

In the example a surface microfibrillated, biaxially oriented substrate comprised of a blend of PP with an inorganic filler, a terpolymer of ethylene/vinyl acetate/carbon monoxide, and a styrenic thermoplastic elastomer was inkjet printed. The film was microfibrillated on a single major surface (i.e. not the whole way through) using the Hydrolace system described above, operating at a water pressure of 15 MPa. The sample was conveyed at 2 m/min below the first jet head having 60 micron in diameter jet orifices with 7.9 orifices per cm. This was done three times.

The resulting microfibrillated material was printed upon using the Xaar piezoelectric inkjet printer as described above. The ink coverage on the surfaces was uniform with no mottling. Evaluation of the test pattern indicated that a series of lines printed at 100% and having widths of 0.35 mm and spaced 0.35 mm apart were, which was equal to or better than the comparative materials examined here. In addition, only at high ink lay down (400%) was there a small but detectible indication of ink feathering. However, it was less than any of the substrates of Comparative Examples C5 through C10, emphasizing that microfibrillation of the oriented surface appears to keep the amount of feathering and inter-color bleed to a minimum. Although this material's surface had a fibrous texture, its microscopic nature was not as disposed to wicking as the fiber surfaces of Comparative Examples C6, C7 and C8 and it did surprisingly improve over the performance of its non-fibrillated oriented counterpart (Comparative Example C10) as well as the smooth PVC films (Comparative Examples C5 and C9). It was also observed that the surface of the substrate felt dry to the touch immediately after printing and the inks were held fast to the surface after drying.

Vertical Hang Test: To evaluate the solvent-based ink's uptake on the microfibrillated surface, a portion of the sample was printed with Scotchcal™ black 3795 at 1,000% ink fill in a 6.5 cm×6.5 cm square and hung vertically immediately after printing. It was observed that the edges of the square showed a small amount of roughness after printing. However, even after hanging for 30 minutes, there was no bleeding and the square retained its original shape. Thus, the overall high ink lay down performance of this sample was superior to both the nonwoven of Comparative Example C6 and the PVC film of Comparative Example C9.

Ink Drying Time Test: To evaluate the solvent-based ink's drying time, a portion of the sample was printed using black at 100% ink fill in a 6.5 cm×6.5 cm square and tested for dryness at various time intervals by pressing lightly on the printed surface with a white piece of paper. It was observed that immediately after printing, there was a small but detectable amount of ink transferred to the paper surface indicating that the ink was not completely dry. However, after 3 minutes, there was no detectable amount of ink transferred to the paper surface, indicating that the ink was dry for handling purposes. This is substantially better drying speed than the PVC film of Comparative Example C9.

Example 14

This example shows solvent-based piezoelectric inkjet printing on a surface microfibrillated, biaxially oriented substrate comprised of a blend of polypropylene with inorganic filler, a terpolymer of ethylene/vinyl acetate/carbon monoxide, and an acrylic resin laminated to an adhesive liner.

Sample Preparation:

In the same manner as described in Comparative Example C4, a film containing 40 weight % polypropylene homopolymer (Fina 3376 available from Atofina Inc., Houston, Tex.) with 40 weight % calcium metasilicate (wollastonite grade 800H available from Fibertec Inc., Bridgewater, Mass.), 10 weight % of a terpolymer of ethylene/vinyl acetate/carbon monoxide (Elvaloy® 741 available from DuPont Packaging and Industrial Polymers, Wilmington, Del.) and 10 weight % of polyisobutyl methacrylate (Paraloid® B-67 available from Rohm and Haas, Co., Philadelphia, Pa.) was compounded and melt pressed. In a similar manner as described in Comparative Example C4, the resulting film was stretched in a Karo IV lab stretcher at 155° C. with draw ratios of 3.5×3.5 (MD×TD) at 4.2 m/min. The resulting biaxially oriented film was microfibrillated on a single major surface (i.e. not the whole way through) using the Hydrolace system described above, operating at a water pressure of 15 MPa. The sample was conveyed at 2 m/min below the first jet head having 60 micron in diameter jet orifices with 7.9 orifices per cm. This was done three times. The resulting microfibrillated film was laminated on the non-fibrillated side with an acrylic-based adhesive coated at 25 gsm onto a polyethylene coated paper liner treated with a cured silicone release system.

Printing Procedure:

A graphic image was printed upon the microfibrillated surface using an Arizona Sign Printer (Model SP-62 available from Gretag Imaging Inc., Holyoke, Mass.) using the Scotchcal™ 3700 series inks described above in addition to light magenta (3781) and light cyan (3786). The graphic was observed to have very good image quality including high resolution and good color densities.

Examples 15–19 (Water-based Inkjet Printer Image Quality Improvement)

As with the solvent-based inks, the CD of the polypropylene-based oriented films printed with water-based inks tended to be low and decreased further when microfibrillated. As with the solvent-based inks, it was also found that blending certain additives into the cast film or applying surface coatings could improve the color density of the microfibrillated surface when printed with water-based inks, without losing their very good image resolution.

Printing Procedure:

The following microfibrillated films were printed upon using the Deskjet 950C inkjet printer described above. The ink used was the HP 51645A black cartridge, and the test pattern used to evaluate image quality consisted of filled characters of various sizes printed at 100% coverage. The CD values were measured as described in Test Method 3 and are reported in Table 4. An increase in CD correlates to an improvement in solid ink fill.

Example 15

This example shows water-based inkjet printing on a surface microfibrillated, uniaxially oriented polypropylene substrate.

A film was cast and oriented in a manner identical to C1 but microfibrillated on a single major surface (i.e. not the whole way through) using the Hydrolace system described above, operating at a water pressure of 15 MPa. The sample was conveyed at 2 m/min below the first jet head having 110 micron in diameter jet orifices with 20 orifices/cm. The second, third, and fourth jet heads were configured with jet strips having 16.5 orifices/cm, with each orifice dimensioned at 120 μm. The oriented film was conveyed perpendicularly to the jet heads (4 above the film) at a speed of 1.5 m/min.

Example 16

This example shows water-based inkjet printing on a surface microfibrillated, uniaxially oriented specimen comprised of polypropylene and a hydrophilic polymer.

A film was prepared by extruding a blend containing 90 weight % polypropylene homopolymer (Fina 3374X, available from Atofina Inc., Houston, Tex.) and 10 weight % of an extrudable, water swellable blend in a single screw extruder with an extruder temperature profile of 210° C., 226° C., 238° C., and 246° C. from the feed throat to the end of the extruder. The neck tube and die were maintained at 246° C. The extruder was equipped with a barrier screw having a mixing tip and with a 12.7 cm wide, single layer die having an orifice gapped to a nominal 1.27 mm. A film having a thickness of 1.36 mm and a width of 127 mm was prepared using a three-roll stack casting station. In the three-roll stack, the bottom chrome-coated stainless steel roll was set to 88° C., the middle chrome-coated stainless steel roll was set to 99° C., and the top silicon rubber roll was cooled with 38° C. water. The polymer melt exiting the extruder die entered the three-roll stack between the bottom and middle rolls, and after passing between the bottom and middle rolls, traveled over the middle roll into the nip formed by the middle and top rolls. After passing over the top roll, the resulting cast film exited the three-roll stack. The extrudable, water swellable blend consisted of the following in weight percent: 57% polyvinylpyrrolidone (PVP K90, available from International Specialty Products, Wayne, N.J.), 24% ionomer (ethylene/acrylic acid copolymer, Surlyn® 1705 available from Dupont Chemical Co., Wilmington, Del.), 14% polyoxyethylene aryl ether (Pycal 94 available Uniqema, Wilmington, Del.), 3% glass beads (MBX-50 available from Sekisui Plastics, Tokyo, Japan), and 2% Irganox 1010 (available from Ciba Specialty Chemicals, Tarrytown, N.Y.). The resulting cast film had a thickness of 1.27 mm, a width of 124 mm, a density of 0.91g/cm$^3$ as determined by Test Method 2.

The cast film was fed from an unwind station into the compressive nip of a first calender (two rolls) at a surface speed of 1.22 m/min, a temperature of 154° C., and a pressure of 2.76 MPa. The film exiting the first calender was fed into a second and third pulling calender set (two rolls in each set) operating at as high a surface speed as possible without breaking the film. The resulting oriented and voided film was wound onto a core under tension. The film was oriented to a draw ratio of 14.6:1 as determined by Test Method 1-A, had a thickness of 119 micrometers, a width of 99 mm, and contained 5.5% voids as determined by Test Method 2. As described in Example 8, the oriented film was microfibrillated on a single major surface using the Honeycomb hydroentangler, operating at 10 MPa at a belt speed of 3 m/min. The sample was conveyed on under the water jets eight times.

Example 17

This example shows water-based inkjet printing on a surface microfibrillated, uniaxially oriented specimen comprised of polypropylene, an inorganic filler and a thermoplastic polyurethane.

A film having a composition of 35 weight % polypropylene homopolymer (Fina 3276 available from Atofina Inc., Houston, Tex.) with 30 weight % calcium carbonate (HiPflex® 100 available from Specialty Minerals, Adams, Mass.), and 35 weight % of thermoplastic polyurethane (Eastane® 58237 available from Noveon Inc., Cleveland, Ohio) was cast using a twin screw extruder with a temperature of 193° C. at the end of the extruder, 211° C. in the neck tube and 195° C. at the die. The extruder was equipped with a 30.5 cm wide die having an orifice gapped to a nominal 0.76 mm. The polymer melt exiting the extruder die entered a three-roll stack between the bottom and middle rolls, and after passing between the bottom and middle rolls, traveled over the middle roll into the nip formed by the middle and top rolls. In the three-roll stack, the bottom and middle rolls were chrome-coated stainless steel set to 38° C. The resulting cast film had a thickness of 0.7 mm and a density of 1.26 g/cm$^3$ as determined by Test Method 2.

The cast film was calendered and length oriented as follows. The cast film was fed from an unwind station through a series of idler rolls and into the compressive nip of a calender (rolls 1 and 2). Rolls 1 and 2 each had a surface temperature of 120° C. The film exiting rolls 1 and 2 was further oriented as it passed over heated roll 3 and then heated roll 4 in an "S" configuration. Rolls 3 and 4 also had surface temperatures of 120° C., and roll 4 had a surface speed of 10.9 m/min. The resulting film passed around a portion of roll 5, which was unheated and simply used to cool the film. The resulting calendered/length oriented film was wound onto a core under tension. The film was oriented to a draw ratio of 5:1 as determined by Test Method 1-A.

The resulting oriented film was microfibrillated on only one major surface using the hydroentangler described in Example 1 operated at a system water pressure of 15 MPa and using only 1 of the 7 water jet heads. The jet head was configured with a jet strip having 20 orifices/cm, with each orifice dimensioned at 110 μm. The oriented film was conveyed perpendicularly to the jet heads (1 above the film) at a speed of 6 m/min.

Example 18

This example shows water-based inkjet printing on a surface microfibrillated, uniaxially oriented specimen comprised of polypropylene and a surfactant.

A film,was prepared as in Example 17 by extruding a blend containing 96 weight % polypropylene homopolymer (Fina 3374X, available from Atofina Inc., Houston, Tex.), 1.2 weight % sorbitan monolaurate, and 2.8 weight % glycerol monolaurate in a single screw extruder. The extruder temperature profile was set to 210° C., 226° C., 238° C., and 249° C., and the neck tube and die were maintained at 249° C. In the three-roll stack, the bottom roll was set to 100° C., the middle roll was set to 100° C., and the top silicon rubber roll was cooled with 38° C. water. The resulting cast film had a thickness of 1.18 mm, a width of 112 mm, a density of 0.91 grams/cm$^3$ as determined by Test Method 2.

The cast film was fed from an unwind station into the compressive nip of a first calender (two rolls) with roll surface speeds of 1.22 m/min, a temperature of 121° C., and a pressure of 3.45 MPa. The film exiting the first calender was fed into a second and third pulling calender set (two rolls in each set) operating at as high a surface speed as possible without breaking the film. The resulting oriented and voided film was wound onto a core under tension. The films were oriented to a draw ratio of 13.5:1 as determined by Test Method 1-A, had a thickness of 138 micrometers, a width of 140 mm, and contained 10.8% voids as determined by Test Method 2. As described in Example 8, the oriented film was microfibrillated on a single major surface using the Honeycomb hydroentangler, operating at 14 MPa at a belt speed of 3 m/min. The sample was conveyed on a solid plate under the water jets eight times.

Example 19

This example shows water-based inkjet printing on a surface microfibrillated, uniaxially oriented polypropylene film coated with a surfactant.

A polypropylene film was prepared by extruding polypropylene homopolymer (Novolen® PP1104K available BASF Corporation, Mount Olive, N.J.) in a single screw extruder with a 30.5 cm wide, single layer die having an orifice gapped to a nominal 2.54 mm. A film having a thickness of 1.75 mm and a width of 320 mm was prepared using a three-roll stack casting station. The resulting cast film had a density of 0.9 gram/cm$^3$ as determined by Test Method 2.

The cast film was calendered and length oriented as follows. The cast film was fed from an unwind station at a rate of 0.27 m/min, through a series of idler rolls and into the compressive nip of a calender (rolls 1 and 2). Rolls 1 and 2 each had a surface speed of 0.29 m/min and 3.17 m/min, respectively, a temperature of 130° C., and a calender nip force of 44.5 kN. The film exiting rolls 1 and 2 was further oriented as it passed over heated roll 3 and then heated roll 4 in an "S" configuration. Roll 3 had a surface speed of 4.75 m/min and a temperature of 130° C. Roll 4 had a surface speed of 10.9 m/min and a temperature of 120° C. The resulting film passed around a portion of roll 5, which was unheated and simply used to cool the film. The resulting calendered/length oriented film was wound onto a core under tension. The film was oriented to a draw ratio of 14.9:1 as determined by Test Method 1-A. The oriented film had a thickness of 203 micrometers, a width of 203 mm, and a density of 0.82 gram/cm$^3$. The film was calculated to contain 9% voids as determined by Test Method 2.

The oriented film was microfibrillated on a single major surface (i.e. not the whole way through) using the Hydrolace system described in Example 1, operating at a water pressure of 15 MPa. The sample was conveyed at 1.5 m/min below the first through fourth jet head having 120 μm in diameter jet orifices with 20 orifices/cm.

The resulting microfibrillated film was immersed in a 3:1 water/isopropyl alcohol solution containing 5 weight % dioctyl sulfosuccinate, sodium salt (DOS) for 30 min and allowed to dry prior to inkjet printing.

TABLE 4

Solid Block Color Densities of Various Solvent-Based Inkjet Printed Samples

| Example | $D_K$ |
|---------|-------|
| 15 | 0.86 |
| 16 | 1.14 |
| 17 | 1.11 |
| 18 | 1.08 |
| 19 | 1.1 |

The results in Table 4 show that, by comparison with polypropylene alone (Example 15), the addition of hydrophilic polymers (Examples 16 and 17) or hydrophilic surfactants (Example 18) to the microfibrillated films through the polymer melt process, or the application of a hydrophilic surfactant via surface coating to the microfibrillated surface significantly improved the image quality of the microfibrillated films when printed with water-based inks, especially with respect to color density.

We claim:

1. A receptor medium comprising an oriented film having at least one microfibrillated surface with a depth of microfibrillation of grater than 10 microns, said microfibrillated surface comprising melt-processed polymeric microfibers having an average effective diameter of less than 20 microns and a transverse aspect ratio of from 1.5:1 to 20:1.

2. The receptor medium of claim 1, wherein said microfibrillated surface comprises polymeric microfibers selected from the group consisting of polyethylene, polypropylene, polyoxymethylene, poly(vinylidine fluoride), poly(methyl pentene), poly(ethylene-chlorotrifluoroethylene), poly(vinyl fluoride), poly(ethylene oxide), poly(ethylene terephthalate), poly(butylene terephthalate), nylon 6, nylon 66, polybutene, polylactides, and thermotropic liquid crystal polymers.

3. The receptor medium of claim 1, wherein said microfibrillated surface comprises polymeric microfibers that comprise of a blend of two or more polymers.

4. The receptor medium of claim 3, wherein the polymers in the blend are selected from the group consisting of polypropylene, polyethylene, poly(ethylene-co-methacrylic acid), poly(ethylene-co-vinyl acetate), acid modified poly (ethylene-co-vinyl acetate) acid/acrylate modified poly (ethylene-co-vinyl acetate), poly(ethylene-co-acrylic acid), and poly(ethylene-co-vinyl acetate-co-carbon monoxide), poly(methylpentene), poly(ethylene oxide), polybutene, polyesters, polylactides, polyvinylpyrrolidone with an ionomer copolymer of ethylene and (meth)acrylic acid, polystyrene/polyisoprene copolymers, acid, acrylate, and maleic anhydride modified poly(ethylene-co-vinyl acetate), polyether-ester elastomers, poly(isobutyl methacrylate), thermoplastic polyurethanes, polycarbonates, nylons, acrylate and methacrylate homopolymers and copolymers, polystyrene, poly(vinylchloride-co-vinyl acetate), poly (vinyl chloride-co-vinyl acetate-co-vinyl alcohol), polyethyleneimines, poly(ethylene-co-methyl acrylate), poly(ethylene-co-octene), polyvinylpyrrolidone with polyvinylalcohol, copolymers or terpolymer of N-vinyl-2-pyrrolidinone with acrylic acid, dimethylaminoethyl acrylate, trimethoxysilylethylmethacrylate, and/or poly (ethylene oxide) acrylate, poly(cyclic olefins), and rubbers.

5. The receptor medium of clam 4, wherein the polyester is poly(ethylene terephthalate), sulfonated poly(ethylene-terephthalate), or poly(butylene terephthalate).

6. The receptor medium of claim 1, further comprising one or more additives selected from the group consisting of surfactants, mordants and mixtures thereof.

7. The receptor medium of claim 1, wherein said microfibrillated surface comprises a melt processed polymer or polymer blend and a void initiating component.

8. The receptor medium of claim 7, wherein said void initiating component is an inorganic solid particulate component, a polymer component, or a mixture thereof.

9. The receptor medium of claim 8, wherein the inorganic component is selected from the group consisting of solid or hollow glass ceramic or metal particles, microspheres or beads, zeolile particles, metal particles metal oxides, alkali- or alkaline earth metal carbonates or sulfates, silicates, metasilicates, aluminates, feldspar, kaolin, talc, titanium dioxide, and carbon black.

10. The receptor medium of claim 9, wherein the inorganic component is calcium metasilicate or calcium carbonate.

11. The receptor medium of claim 8, wherein said void initiating polymer component is selected from the group consisting of polypropylene, polyethylene, poly(propylene-co-ethylene), polylactide, poly(alpha)olefins, polyoxymethylene, poly(vinylidine fluoride), poly(methyl pentene), poly(ethylene-chlorotrifluoroethylene), poly(vinyl fluoride), polyamies, polybutene, thermoplastic polyurethanes, polycarbonates, polymethylpentene, a polyester, acrylate and methacrylate homopolymers and copolymers, cyclic polyolefins, rubbers copolymers of ethylene, polystyrene, copolymers of polystyrene, copolymer of polystyrene and polyisoprene, polyisobutylene, epoxides, polyvinylpyrrolidone, vinylpyrrolidinone copolymers, and combinations thereof.

12. The receptor medium of claim 11, wherein the polyester is poly(ethylene terephthalate), sulfonated poly (ethylene terephthalate), or poly(butylene terephthalate).

13. The receptor medium of claim 11, wherein the copolymers of ethylene are selected from the group consisting of poly(ethylene-co-vinylacetate), acid/acrylate modified ethylene vinyl acetate resin, terpolymer of ethylene/vinyl acetate/carbon monoxide/ethylene, and combinations thereof.

14. The receptor medium of claim 7, further comprising one or more additives selected from the group consisting of surfactants, mordants and mixtures thereof.

15. An imaged graphics film comprising the receptor medium of claim 7 having an inkjettable material on the microfibrillated surface of the receptor medium.

16. The receptor medium of claim 1, wherein the film comprises one or more layers.

17. The receptor medium of claim 16 comprising a uniaxially oriented microfibrillated film layer and an unfibrillated biaxially oriented film layer.

18. The receptor medium of claim 1, further comprising an adhesive layer on a major surface opposite the microfibrillated surface.

19. The receptor medium of claim 18, further comprising a release liner protecting the adhesive layer.

20. The receptor medium of claim 1, wherein the film is in roll form.

21. The receptor medium of claim 1, wherein the film is translucent.

22. A microfibrillated receptor medium comprising the receptor medium of claim 1 and a material deposited on the microfibrillated surface.

23. The receptor medium of claim 22, wherein tho material is jettable.

24. The receptor medium of claim 23, wherein the jettable material is selected from the group comprising inks, adhesives, particulate dispersions, electrically, thermally or magnetically modifiable materials, biological fluids, chemical reagents, and combinations thereof.

25. The receptor medium of claim 23, wherein the jettable material is a dye based ink.

26. The receptor medium of claim 23, wherein the jettable material is a pigmented ink.

27. The receptor medium of claim 23, wherein the jettable material is a solvent based ink.

28. The receptor medium of claim 23, wherein the jettable material is a radiation curable ink.

29. The receptor medium of claim 23, wherein the jettable matorial is a water based ink.

30. The receptor medium of claim 23, wherein the jettable material is an aqueous ink containing a dispersion of at least one polymer.

31. An imaged graphics film comprising the receptor medium of claim 1 having an inkjettable material on the microfibrillated surface of the receptor medium.

32. An imaged graphics film comprising the receptor medium of claim 1 having an inkjettable material on the microfibrillated surface of the receptor medium.

33. A multiple component receptor medium comprising:
(a) a biaxially oriented film having at least one microfibrillated surface;
(b) an adhesive layer on a major surface opposite the microfibrillated surface;
(c) a release liner protecting the adhesive layer; and
(d) an inkjettable material deposited on tie microfibrillated surface.

34. The receptor medium of claim 33, wherein said microfibrillated surface comprises polymeric microfibers comprised of polypropylene, polylactides, or blends of polypropylene and poly(ethylene terephthalate), poly (butylene terephthalate), poly(ethylene-co-vinyl acetate-co-carbon monoxide), poly(isobutyl methacrylate), or mixtures thereof.

35. The receptor medium of claim 34, further comprising one or more additives selected from the group consisting of surfactants, mordants and mixtures thereof.

36. The receptor medium of claim 33, wherein said microfibrillated surface comprises an immiscible mixture of polypropylene and a void initiating component.

37. The receptor medium of claim 36, wherein said void initiating component is an inorganic solid particulate component, a polymer component, or a mixture thereof.

38. The receptor medium of claim 37, wherein the inorganic component is selected from the group consisting of solid or hollow glass, ceramic or metal particles, microspheres or beads, zeolite particles, metal particles, metal oxides, alkali- or alkaline earth metal carbonates or sulfates, silicates, metasilicates, aluminates, feldspar, kaolin, talc, titanium dioxide, and carbon black.

39. The receptor medium of claim 38, wherein the inorganic component is calcium metasilicate.

40. The receptor medium of claim 37, wherein said void initiating polymer is selected from the group consisting of polypropylene, polyethylene, poly(propylene-co-ethylene), polylactide, poly(alpha)olefins, polyoxymethylene, poly (vinylidine fluoride), poly(methyl pentene), poly(ethylene-chlorotrifluoroethylene), poly(vinyl fluoride), polyamides, polybutene, thermoplastic polyurethanes, polycarbonates, polymethylpentene, a polyester, acrylate and methacrylate homopolymers and copolymers, cyclic polyolefins, rubbers, copolymers of ethylene, polystyrene, copolymer of polystyrene and polyisoprene, copolymers of polystyrene, polyisobutylene, epoxides, polyvinylpyrrolidone, vinylpyrrolidinone copolymers, and combinations thereof.

41. The receptor medium of claim 40, wherein the copolymers of ethylene are selected from the group consisting of poly(ethylene-co-vinyl acetate), acid/acrylate modified ethylene vinyl acetate resin, terpolymer of ethylene/vinyl acetate/carbon monoxide/ethylene, and combinations thereof.

42. A receptor medium comprising a biaxially oriented film having at least one microfibrillated surface, said surface comprising:
(a) polypropylene; and
(b) a void initiating component comprising an inorganic component and copolymers of ethylene selected from the group consisting of poly(ethylene-co-vinyl acetate), acid/acrylate modified ethylene vinyl acetate resin, terpolymer of ethylene/vinyl acetate/carbon monoxide/ethylene, and combinations thereof.

43. An imaged graphics film comprising the receptor medium of claim 42 having an inkjettable material deposited on the microfibrillated surface of the receptor medium.

44. A multiple component receptor medium comprising:
(a) a biaxially oriented film having at least one microfibrillated surface said surface comprising:
(i) polypropylene; and
(ii) a void initiating component comprising an inorganic component and copolymers of ethylene selected from the group consisting of poly(ethylene-co-vinyl acetate), acid/acrylate modified ethylene vinyl acetate resin, terpolymer of ethylene/vinyl acetate/carbon monoxide/ethylene, and combinations thereof; and
(b) an adhesive layer on a major surface opposite the microfibrillated surface;
(c) a release liner protecting the adhesive layer; and
(d) a solvent based ink deposited on the microfibrillated surface.

* * * * *

UNITED STATES PATENT AND TRADEMARK OFFICE
CERTIFICATE OF CORRECTION

PATENT NO. : 6,753,080 B1
APPLICATION NO. : 10/059591
DATED : June 22, 2004
INVENTOR(S) : Sebastian, John M.

It is certified that error appears in the above-identified patent and that said Letters Patent is hereby corrected as shown below:

Title page,
Item [75], Inventors, delete "Jeffrey O. Ernslander" and insert -- Jeffrey O. Emslander --.
Item [56], References Cited, FOREIGN PATENT DOCUMENTS, delete "00/730873 A1" and insert -- 00/73083 A1 --.

Column 1,
Line 16, delete "modem" and insert -- modern --.

Column 7,
Line 28, after "or" delete "in".

Column 9,
Line 3, delete "$\Delta G_m \cong \Delta H_m 0$" and insert -- $\Delta G_m \cong \Delta H_m > 0$ --.

Column 10,
Line 47, delete "190,000" and insert -- 100,000 --.

Column 11,
Line 48, after "be" delete "id".

Column 18,
Line 22, after "MPa" delete "4".
Line 23, delete "beads" and insert -- heads --.

Column 19,
Line 2, delete "ajar" and insert -- a jar --.

Column 22,
Line 62, delete "at-a" and insert -- at a --.

Column 23,
Line 51, after "single" delete "Rat".

Column 25,
Line 3, delete "homopolymner" and insert -- homopolymer --.

Column 28,
Line 64, delete "The" and insert -- A --. After "film was" insert
-- cast and oriented the same manner as described in Comparative Example C10 and --.

UNITED STATES PATENT AND TRADEMARK OFFICE
CERTIFICATE OF CORRECTION

PATENT NO. : 6,753,080 B1
APPLICATION NO. : 10/059591
DATED : June 22, 2004
INVENTOR(S) : Sebastian, John M.

It is certified that error appears in the above-identified patent and that said Letters Patent is hereby corrected as shown below:

Column 32,
Line 30, after "film" delete ",".

Column 33,
Line 60, delete "grater" and insert -- greater --.

Column 34,
Line 32, delete "Clam" and insert -- claim --.
Line 46, after "glass" insert -- , --.
Line 47, delete "Zeolile" and insert -- Zeolite --, and after "particles" insert -- , --.
Line 52, after "metasilicate" insert -- , --.
Line 60, delete "polyamies" and insert -- polyamides --.
Line 63, after "rubbers" insert -- , --.

Column 35,
Line 31, delete "tho" and insert -- the --.
Line 47, delete "matorial" and insert -- material --.
Line 62, delete "tie" and insert -- the --.

Column 36,
Line 52, after "surface" insert -- , --.

Signed and Sealed this

Eleventh Day of July, 2006

JON W. DUDAS
*Director of the United States Patent and Trademark Office*